(12) United States Patent
Dery et al.

(10) Patent No.: US 11,471,724 B2
(45) Date of Patent: Oct. 18, 2022

(54) ROOFTOP MOUNT FOR EXERCISE EQUIPMENT

(71) Applicant: Sportslinq LLC, Boca Raton, FL (US)

(72) Inventors: Keith Mark Dery, New Market, MD (US); Donald D. Fink, Baker City, OR (US); Stephen Fink, Fredericksburg, VA (US); Steve Yang, Mansfield, MA (US)

(73) Assignee: Sportslinq LLC, Boca Raton, FL (US)

( * ) Notice: Subject to any disclaimer, the term of this patent is extended or adjusted under 35 U.S.C. 154(b) by 141 days.

(21) Appl. No.: 16/749,612

(22) Filed: Jan. 22, 2020

(65) Prior Publication Data

US 2020/0230458 A1  Jul. 23, 2020

Related U.S. Application Data

(60) Provisional application No. 62/795,308, filed on Jan. 22, 2019.

(51) Int. Cl.
*B60R 9/08* (2006.01)
*A63B 71/00* (2006.01)
(Continued)

(52) U.S. Cl.
CPC .............. *A63B 21/16* (2013.01); *A63B 17/00* (2013.01); *A63B 21/00047* (2013.01);
(Continued)

(58) Field of Classification Search
CPC ... A63B 21/16; A63B 21/00047; A63B 17/00; A63B 71/0036; B60P 3/00; B60P 3/1008;
(Continued)

(56) References Cited

U.S. PATENT DOCUMENTS 5,360,150 A  11/1994 Praz
5,569,167 A  10/1996 Friedli
(Continued)

FOREIGN PATENT DOCUMENTS

GB  2578448 A  * 5/2020  .......... B65D 88/121
WO  2016176733 A1  11/2016

OTHER PUBLICATIONS

International Search Report and Written Opinion dated May 22, 2020; Application Serial No. PCT/US20/14611 in the name of Sportslinq LLC.

*Primary Examiner* — Hilary L Gutman
(74) *Attorney, Agent, or Firm* — Johnson & Martin, P.A.; James David Johnson

(57) ABSTRACT

A rooftop mount device for connecting to a roof of a portable gym and for attaching exercise equipment is described. The portable gym is a portable container, such as a shipping container, having a top surface, or roof, to which the rooftop mount is attachable. The rooftop mount device includes connection members. The rooftop mount can also include one or more horizontal stabilization members and equipment attachment elements. The connection members are attached to a roof of the container. Exercise equipment is attached to the parts of the rooftop mount device. The rooftop mount provides proper height and stability for the bars, racks, stands, cages, rigs and riggings, and other exercise equipment that are attached to the container's roof so that the equipment does not move during use by an exerciser. Systems and kits are also described, which include a rooftop mount device, various exercise equipment, and a portable container.

19 Claims, 14 Drawing Sheets

(51) Int. Cl.
*A63B 21/16* (2006.01)
*A63B 21/00* (2006.01)
*A63B 17/00* (2006.01)
B60P 3/10 (2006.01)
B65D 88/12 (2006.01)
B60P 3/00 (2006.01)
B60R 11/00 (2006.01)

(52) U.S. Cl.
CPC .............. *B60P 3/1008* (2013.01); *B60R 9/08* (2013.01); *A63B 71/0036* (2013.01); *B60P 3/00* (2013.01); *B60R 11/00* (2013.01); *B60R 2011/0042* (2013.01); *B65D 88/121* (2013.01)

(58) Field of Classification Search
CPC ... B60R 9/08; B60R 11/00; B60R 2011/0042; B65D 88/121
USPC ........................................................ 296/24.3
See application file for complete search history.

(56) References Cited

U.S. PATENT DOCUMENTS

| | | |
|---|---|---|
| 9,302,144 B1 | 4/2016 | Benavides |
| 2013/0053220 A1 | 2/2013 | Monaco |
| 2015/0059257 A1 | 3/2015 | Beaver et al. |
| 2017/0096091 A1 | 4/2017 | Johnson |
| 2017/0209733 A1 | 7/2017 | Beaver et al. |
| 2018/0028852 A1 | 2/2018 | Beaver et al. |
| 2018/0326250 A1 | 11/2018 | Henninger et al. |

\* cited by examiner

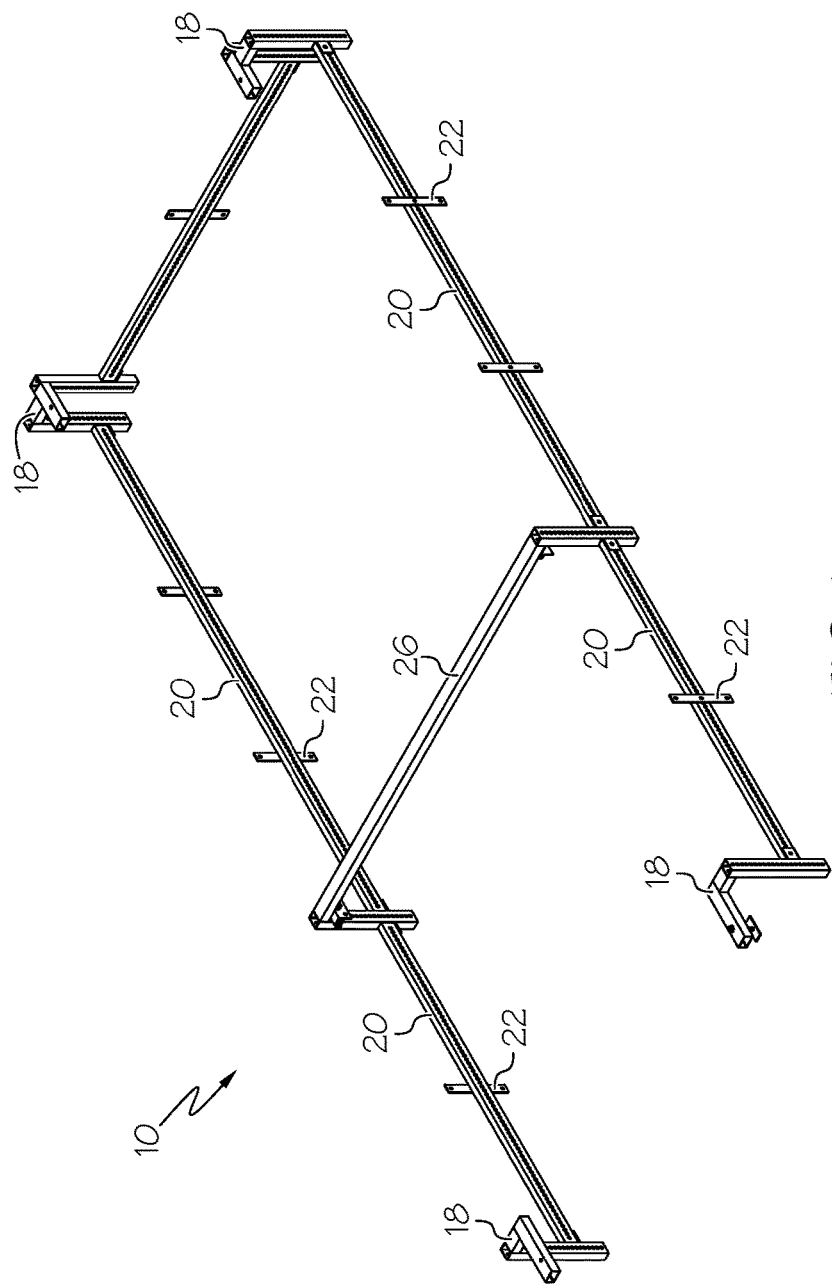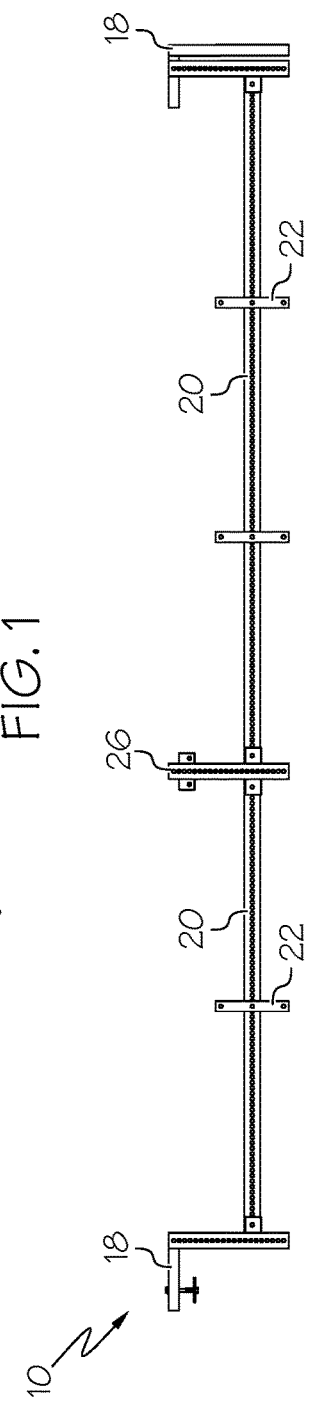

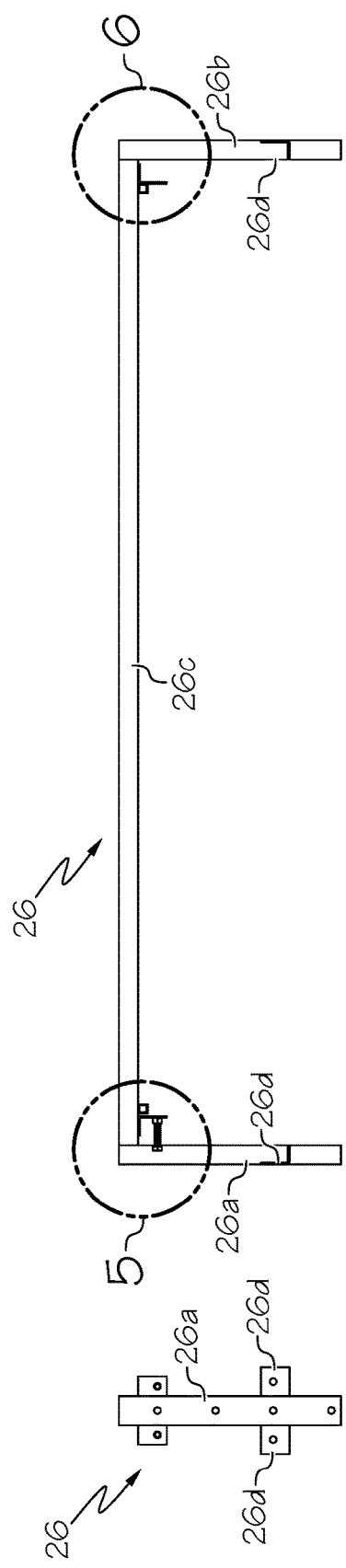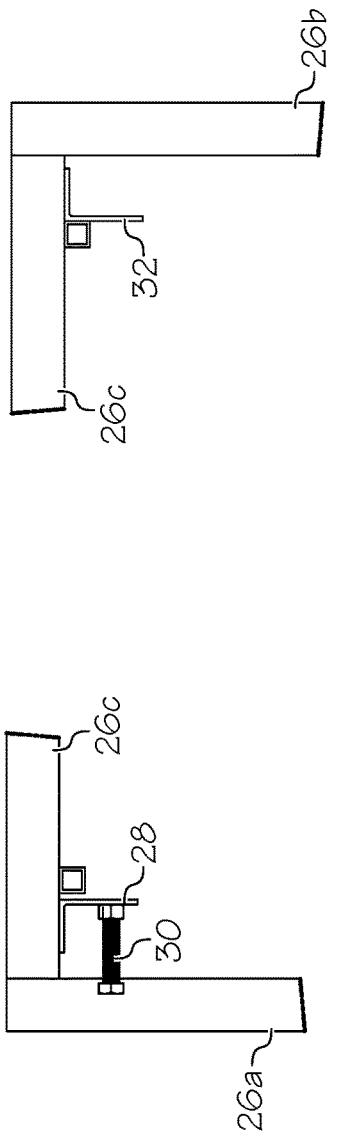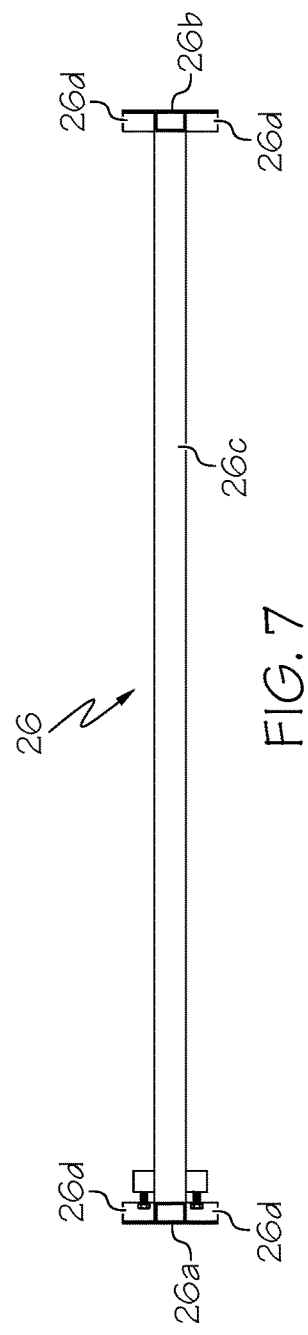

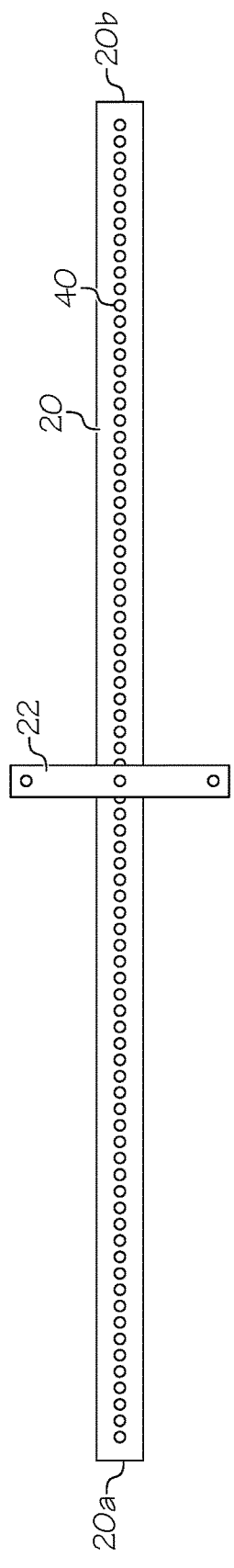
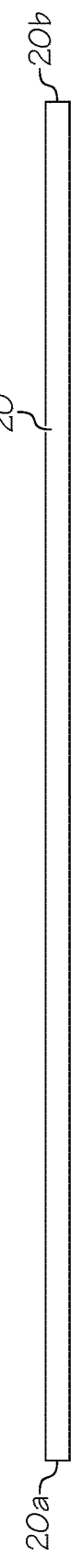
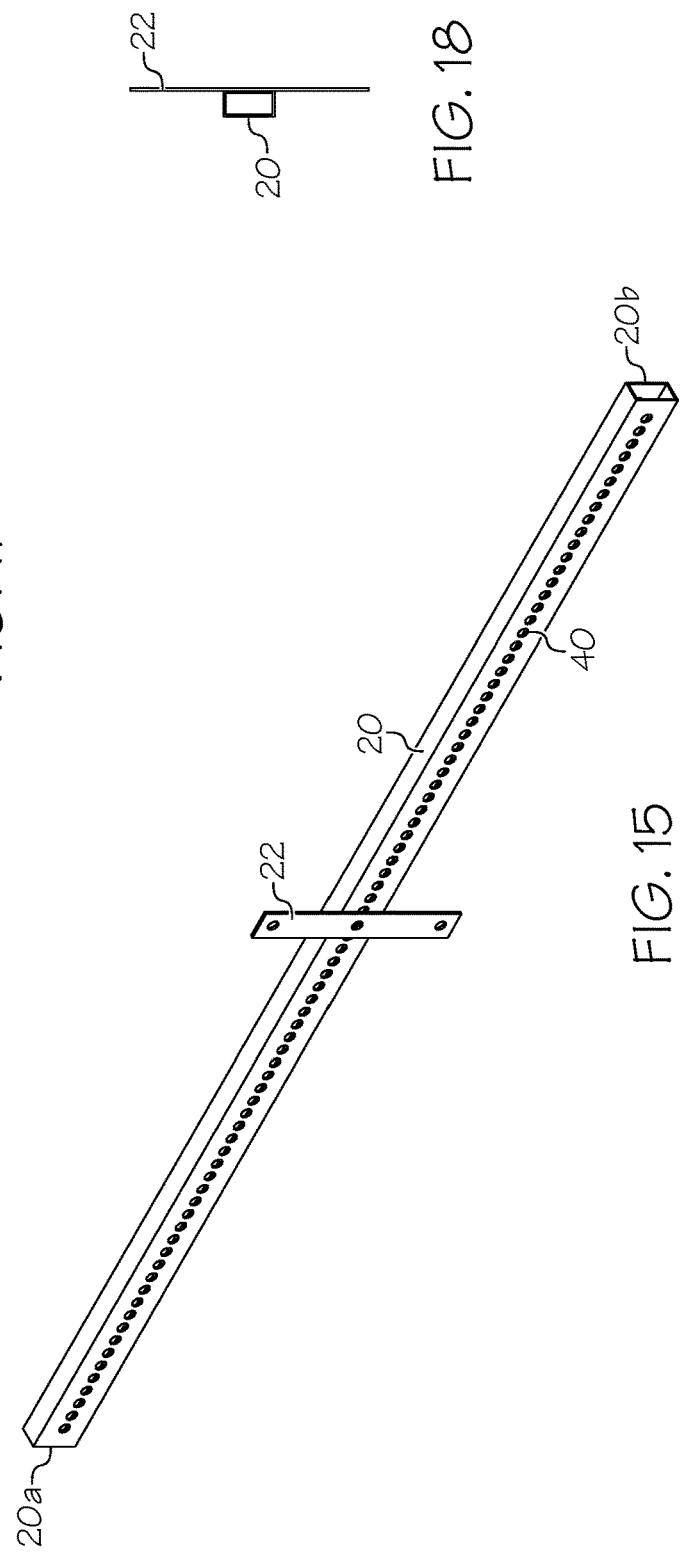

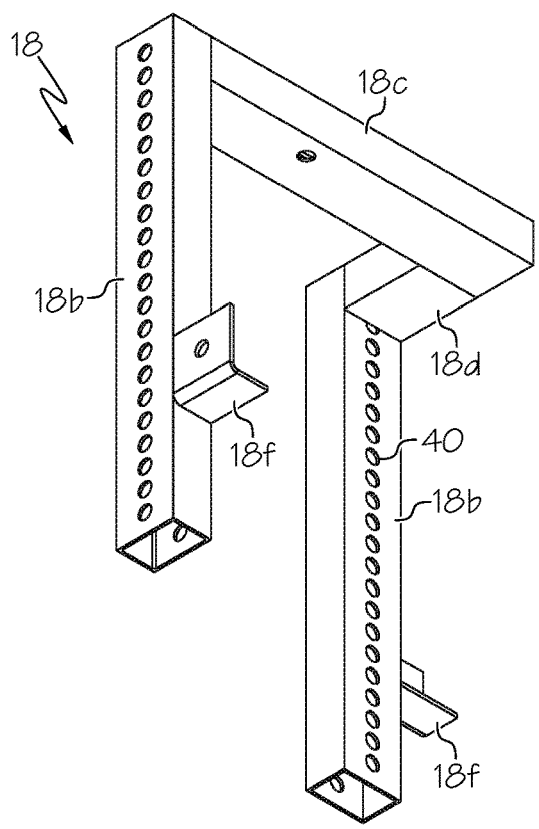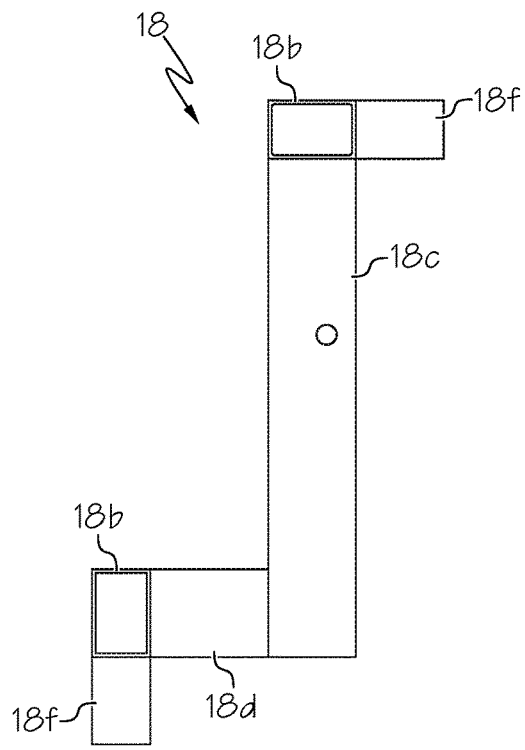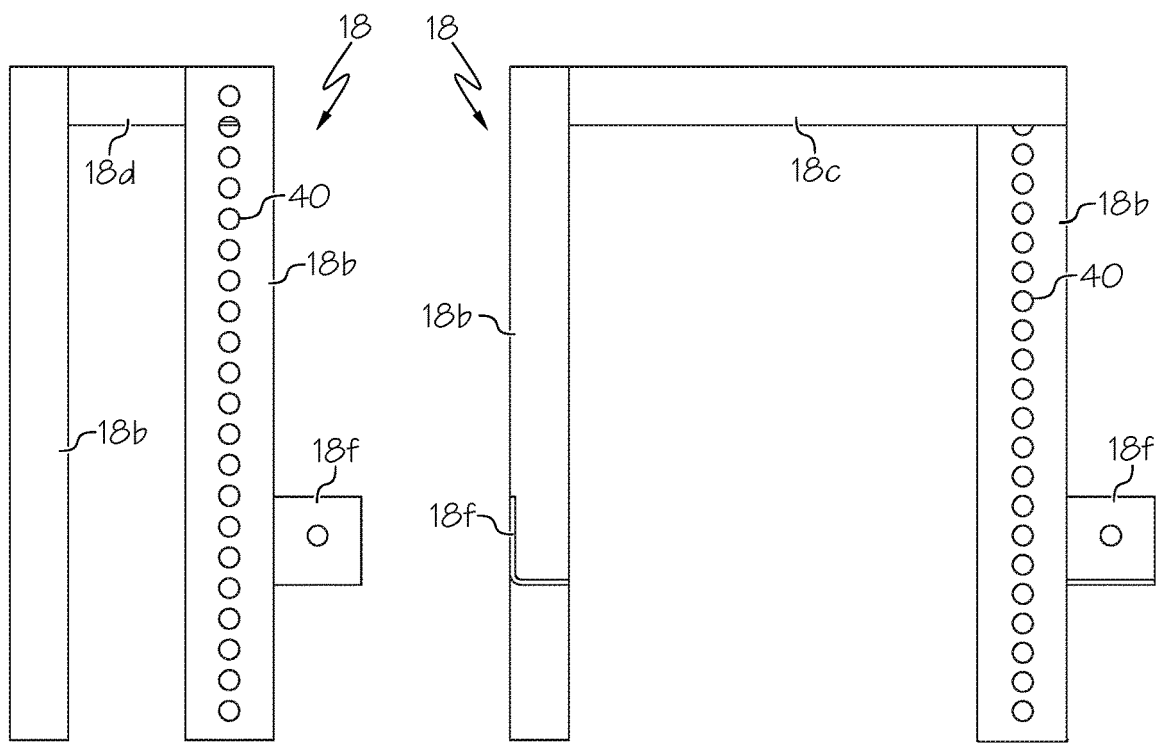
FIG. 27
FIG. 28
FIG. 29
FIG. 30

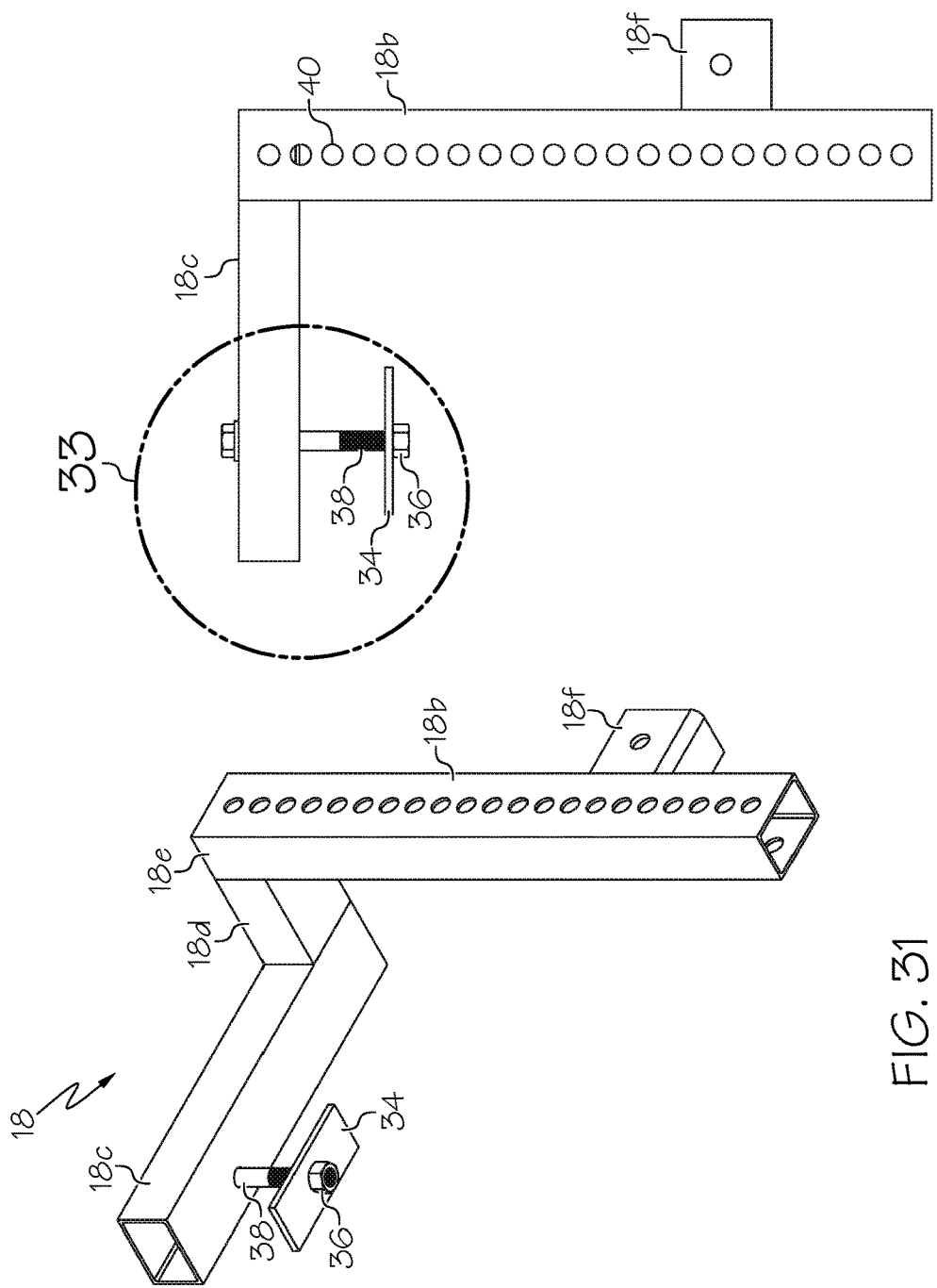

ROOFTOP MOUNT FOR EXERCISE EQUIPMENT

FIELD OF THE INVENTION

The invention relates to exercise equipment and gyms. More particularly, the invention relates to a rooftop mount device for connection to a roof of a shipping container for attaching exercise equipment to the device for use as a portable gym.

BACKGROUND

Transport of exercise equipment for use in other locations remote from the home or workplace of the user is both difficult and expensive due to the weight and size of such equipment. Exercisers typically utilize exercise equipment in commercial gyms, home gyms, or gyms located at their workplaces, or when traveling, in hotels. The aforementioned problem inherent in the transportation of this equipment becomes most difficult when the user (and particularly, a group of users) travel to a location that does not have any gym or other exercise facilities. For example, members of the military deployed to remote locations may have no access to local gym facilities. Similarly, attendees at outdoor music concerts and other festivals, and especially those lasting multiple days, may have the desire to continue their usual exercise routines but are unlikely to have access to any exercise equipment or gym facilities.

Conventional examples of portable gyms that use shipping containers for storage and installation of exercise equipment to create mobile "pop-up" gyms install mounting equipment on and through the walls of the containers. By creating new holes in the walls of the containers, the mounting equipment of these conventional portable gyms destroy or harm the integrity of the container by allowing water intrusion into the container as well as animals and debris to enter into the interior spaces of the container. Water intrusion and animal infestations are particularly problematic in that water may corrode or rust both the container as well as exercise equipment stored therein. Animals, such as rodents, may chew and cause damage to the exercise equipment stored in the container or may cause contamination through feces and urine and nesting that can lead to the spread of infectious diseases or of parasites. Rather than maintaining the integrity of the storage container and its contents, such wall-mounted portable gym mounting equipment presents numerous problems that increase the cost of maintenance and shorten the life and usefulness of the container and the equipment stored therein. In the case of military usage, such containers are likely to be shipped via oceangoing ships or may be located after delivery near to the ocean or other bodies of water. In any of these cases, water intrusion and damage through mounting holes drilled through the container's side walls are rife with problems as explained above, and in particular, when exposure to saltwater is likely.

Mounting equipment installed through holes drilled or otherwise made in the side walls of a container can also lead to damage to the container's wall due to the combined weight of the mounting equipment, exercise equipment installed thereon, and human weight. Although container walls are generally strong, the stress of such weight loads on vertical side walls could result in wall failure, for example, by loosening of the mounting equipment after time with repeated usage so that the attached exercise equipment is unstable, for example, wobbly or otherwise subject to unwanted movement during use. In worst case scenarios, the weight of the foregoing items and person might cause the mounting equipment to pull entirely out of the wall potentially leading to injury of the exerciser or damage to the exercise equipment.

In addition, the standard height of most shipping containers is 8 feet, 8.5 feet, 9 feet, or 9.5 feet. Depending on the type of exercise being performed and on the height of the exerciser, mounting the exercise equipment to the side walls of the container may not allow sufficient clearance above the ground so that the exerciser's body (e.g., feet or legs) contacts the ground as an exercise is being performed. Wall-mounted portable gym systems provide reduced flexibility in adjusting the height of installation of exercise equipment to the container, as such wall-mount systems are disadvantaged and limited by the height of the container's walls.

A need exists for a mount device for attaching exercise equipment to a portable gym facility (e.g., a container), which can be packed, stored, and transported easily and inexpensively. A need also exists for a mount device for attaching exercise equipment to a portable gym facility that can be assembled and disassembled easily as the portable gym facility is transported between locations for use by users. A further need exists for a portable gym container into which exercise equipment can be packed and stored when not in use, and to which exercise equipment may be connected for stabilization and support when the equipment is assembled for use by one or more exercisers. Yet another need exists for a mount device that can be used to attach exercise equipment to a portable gym facility without making holes in the wall of the portable gym facility that could allow intrusion of water, animals, or debris. Still another need exists for a mount device that provides vertically adjustable points of attachment to the portable gym facility to permit exercisers to have sufficient available vertical height to perform various exercises using the exercise equipment connected to the mount. Finally, another need exists for a mount device that is installable stably and securely on and to a container without damaging, harming, or destroying the integrity of the shipping container and its walls and that does not present risk of structural failure, damage to equipment, or injury.

SUMMARY

The invention relates to a rooftop mount device for connecting to a roof of a portable gym facility and for attaching exercise equipment thereto. The portable gym facility is a portable container or other portable object having an interior space, such as a shipping container, having a top surface, or roof, to which the rooftop mount device is attachable. The rooftop mount device includes connection members that are attachable to a roof of a container. The rooftop mount device can also include one or more horizontal stabilization members. The rooftop mount device can further include equipment attachment elements installed on one or more of the connection members or horizontal stabilization members. The connection members include parts that allow them to be attached to a roof of the container and to allow exercise equipment to be attached to them without contacting a side wall of the container. Exercise equipment is attached to the connection members, horizontal stabilization members, equipment attachment elements, or to a combination of two or more of the foregoing. Each connection member and horizontal stabilization member includes a plurality of apertures across its length for receiving pins, bolts, screws, or other fasteners or attachment apparatuses that are insertable into the apertures to stably and securely connect the exercise equipment to the rooftop mount device. The rooftop mount device provides proper height and stability for the bars, racks, stands, cages, rigs and riggings, and other exercise equipment that are attached to the container's roof so that the equipment does not move during use by an exerciser.

The various items of exercise equipment are storable inside the portable gym (i.e., within the interior space of the container) when not in use and removable from the container when a user desires to exercise. The exercise equipment includes workout bars, racks, stands, rigs and riggings, and cages for calisthenics or bodyweight exercises as well as weights for weight equipment exercises. The workout bars, racks, stands, rigs and riggings, and cages are attachable to the roof of the portable gym container to provide stability and proper height to them when they are used by an exerciser during a workout.

Portable gym systems and kits are also described, which include a rooftop mount device, various items of exercise equipment, and a portable gym. The portable gym system, which can be provided as a kit, is assemblable for use and disassemblable for storage and transport inside the interior space of the container. The portable gym can be transported for use in different locations. The portable gym system can be a kit that can be transported, configured and assembled, and disassembled as desired.

The inventions described provide an advantage in that the rooftop mount device is useful for attaching exercise equipment to a portable gym facility (e.g., a container), which can be packed, stored, and transported easily and inexpensively. The inventions described herein also provide another advantage in that the rooftop mount device is useful for attaching exercise equipment to a portable gym facility that can be assembled and disassembled easily as the portable gym facility is transported between locations for use by users. A further advantage is provided by the inventions described herein in that the rooftop mount device is useful for attaching exercise equipment to a portable gym facility (e.g., to a container) without making holes in the wall of the portable gym facility that could allow intrusion of water, animals, or debris. Still another advantage of the rooftop mount device and other inventions described herein is that they provide vertically adjustable points of attachment to the portable gym facility to permit exercisers to have sufficient available vertical height to perform various exercises using the exercise equipment connected to the mount for ample clearance of the exerciser's body above the substrate on which the container rests. Finally, the rooftop mount device and other inventions described herein provide another advantage in that they are installable stably and securely on and to a container without damaging, harming, or destroying the integrity of the shipping container and its walls and that does not present risk of structural failure, damage to equipment, or injury. Rather, the rooftop mount device has an important benefit of being installable on and to a shipping container using existing holes in the roof of the container, for example, the existing holes in the corner castings found at each corner of the roof of a shipping container.

Accordingly, the invention features a rooftop mount device for connecting to a roof of a container and attaching exercise equipment thereto. The rooftop mount device includes at least two connection members that are attachable to a roof of a container and at least one horizontal stabilization member for connecting between two opposing connection members of the at least two connection members when the rooftop mount device is attached to the roof of the container. The exercise equipment is connectable to the rooftop mount device at the connection members, at the horizontal stabilization member, or at both. The exercise equipment is adjustably attachable both horizontally and vertically at a plurality of connection points on the connection members and the horizontal stabilization member.

In another aspect, the invention can feature the exercise equipment being or including workout bars, racks, stands, and cages for calisthenics or bodyweight exercises.

In another aspect, the invention can feature the rooftop mount device having at least four of the connection members.

In another aspect, the invention can feature each connection member connecting to the roof of the container at a corner casting, wherein one corner casting is located at each corner at a top side of the container.

In another aspect, the invention can feature each connection member including a horizontal element and a vertical element. The horizontal element includes an attachment portion at which the connection member is attachable to the roof of the container and an extension portion that extends beyond the horizontal edge of the roof when the rooftop mount device is installed on the roof. The vertical element includes a top portion that connects to the extension portion of the horizontal element and a connection body for attaching the at least one horizontal stabilization member to the vertical element. The vertical element extends downward parallel to, but not in contact with, a side wall of the container.

In another aspect, the invention can feature the horizontal stabilization member including a horizontal brace having a first end and a second end, wherein the first end attaches to at least one of the connection members.

In another aspect, the invention can feature the rooftop mount device further including a center brace having a left vertical portion, a right vertical portion, and a horizontal portion. The left and right vertical portions each attach to the roof of the container at opposing points located at left and right sides of the container between connection members. The horizontal portion extends across the roof and includes a first end that connects to the left vertical portion and a second end that connects to the right vertical portion.

In another aspect, the invention can feature the left vertical portion and the right vertical portion of the center brace each including at least one connection body for attaching the at least one horizontal stabilization member to the vertical portion adjacent to it.

In another aspect, the invention can feature the center brace including a plate for contacting against the roof at one side. The plate extends downward from a bottom of the horizontal portion. The center brace further includes a tension bolt that, when tightened, presses the plate against the roof of the container to maintain the at least one horizontal stabilization member in position during use of the exercise equipment.

In another aspect, the invention can feature the at least two connection members each including a vertical portion and a tab protruding from one side. The tab is sized and shaped to fit into an aperture of a corner casting of the container to permit installation of the at least two connection members without tools.

In another aspect, the invention can feature the at least two connection members including a plurality of apertures for receiving pins or other fasteners to connect exercise equipment to them.

In another aspect, the invention can feature the at least one horizontal stabilization member including a plurality of apertures for receiving pins or other fasteners to connect exercise equipment to it.

In another aspect, the invention can feature the rooftop mount device further including one or more equipment attachment elements connected to the at least one horizontal stabilization member, wherein each of the one or more equipment attachment elements is adjustable in its position of attachment to the at least one horizontal stabilization member.

The invention also features a portable gym system that includes an object having a roof and a storage area for holding and storing exercise equipment and a rooftop mount device for connecting to the roof and attaching exercise equipment thereto. The rooftop mount device includes connection members that are attachable to the roof and a horizontal stabilization member for connecting between vertical elements of two opposing connection members when the rooftop mount device is attached to the roof. The exercise equipment is connectable to the rooftop mount device at the connection members, at the horizontal stabilization member, or at both. The exercise equipment is adjustably attachable both horizontally and vertically at a plurality of connection points on the connection members and the horizontal stabilization member.

In another aspect, the invention can feature the portable gym system further including exercise equipment storable in the storage area of the object, wherein at least part of the exercise equipment is attachable to the rooftop mount device.

In another aspect, the invention can feature the object being a shipping container, a storage container, a trailer of a tractor trailer, a box of a box truck, a trailer home, a motor home, a camper, a recreational vehicle, or any other portable object having sufficient height and enclosing an interior space in which exercise equipment is storable.

In another aspect, the invention can feature the system including two horizontal stabilization members installed on two sides of the roof.

In another aspect, the invention can feature the system including three horizontal stabilization members installed on three sides of the roof.

The invention also relates to a rooftop mount device for connecting to a roof of a container and attaching exercise equipment thereto. The rooftop mount device includes at least two connection members that are attachable to a roof of a container, wherein each connection member includes attachment means for connecting exercise equipment to the connection member without contacting a wall of the container. The exercise equipment is connectable to the rooftop mount device at the connection members and is adjustably attachable and repositionable both horizontally and vertically at a plurality of connection points on the connection members.

A method of the invention can be used for attaching exercise equipment to a roof of a container so that the exercise equipment is secure, stable, and adjustable in its position. The method includes the steps of: (a) attaching at least two connection members to a roof of a container, wherein each connection member includes a vertical element that extends downward parallel to, but not in contact with, a side wall of the container; (b) attaching at least one horizontal stabilization member between the vertical elements of the at least two connection members; and (c) connecting exercise equipment to the at least two connection members, to the at least one horizontal stabilization member, or to both. The exercise equipment is adjustably attachable both horizontally and vertically at a plurality of connection points on the at least two connection members and the at least one horizontal stabilization member.

Another method of the invention can include the at least two connection members each including a vertical portion and a tab protruding from one side, wherein the tab is sized and shaped to fit into an aperture of a corner casting of the container, and wherein the tab is inserted into the aperture of the corner casting to install a connection member without tools.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 1 is a perspective view of one embodiment of a rooftop mount for connecting exercise equipment to a roof of a container.

FIG. 2 is a side elevation view of the rooftop mount device of FIG. 1.

FIG. 3 is a left side elevation view of a center brace of the rooftop mount device of FIG. 1.

FIG. 4 is a front side elevation view of the center brace of FIG. 3.

FIG. 5 is a close-up view of a left end of the center brace of FIG. 3.

FIG. 6 is a close-up view of a right end of the center brace of FIG. 3.

FIG. 7 is a bottom plan view of the center brace of FIG. 3.

FIG. 15 is a perspective view of a horizontal brace of the rooftop mount device of FIG. 1.

FIG. 16 is a front side elevation view of the horizontal brace of FIG. 15.

FIG. 17 is a top plan view of the horizontal brace of FIG. 15.

FIG. 18 is a right side elevation view of the horizontal brace of FIG. 15.

FIG. 27 is a perspective view of a right rear corner connection member of the rooftop mount device of FIG. 1.

FIG. 28 is a bottom plan view of the right rear corner connection member of FIG. 27.

FIG. 29 is a left side elevation view of the right rear corner connection member of FIG. 27.

FIG. 30 is a right side elevation view of the right rear corner connection member of FIG. 27.

FIG. 31 is a perspective view of a right front corner connection member, with bolt and nut plate, of the rooftop mount device of FIG. 1.

FIG. 32 is a right side elevation view of the right front corner connection member of FIG. 31.

FIG. 33 is a close-up view of the bolt and nut plate attached to the right front corner connection member of FIG. 31.

DETAILED DESCRIPTION

Figure 11:
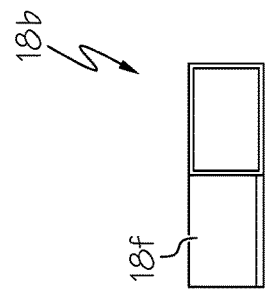
FIG. 11 is a top plan view of the left down tube of FIG. 8.
Figure 10:
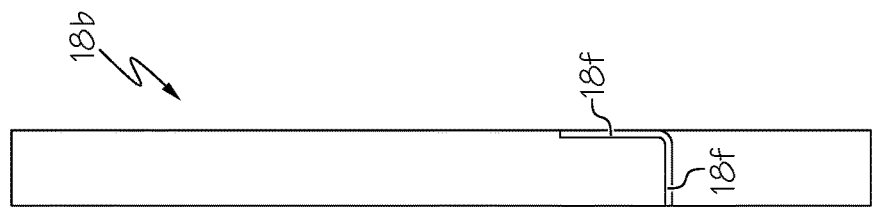
FIG. 10 is a left side elevation view of the left down tube of FIG. 8.
Figure 9:
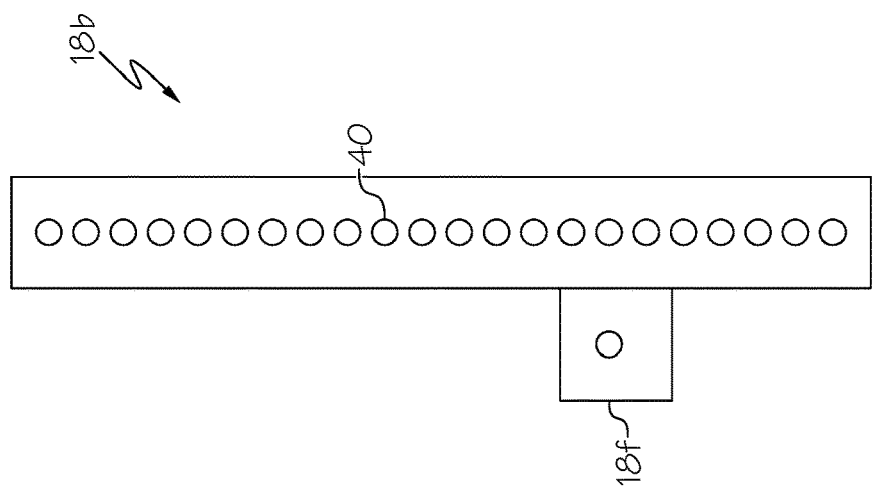
FIG. 9 is a front side elevation view of the left down tube of FIG. 8.
Figure 8:
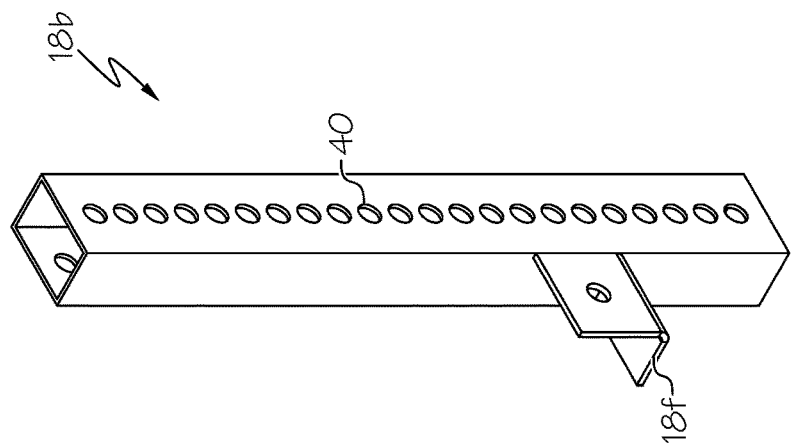
FIG. 8 is a perspective view of a left down tube of a connection member of the rooftop mount device of FIG. 1.
Figure 14B:
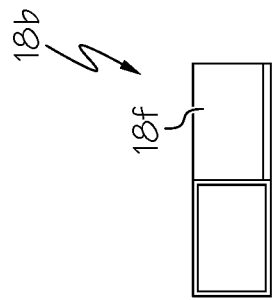
FIG. 14B is a top plan view of the right down tube of FIG. 12.
Figure 14A:
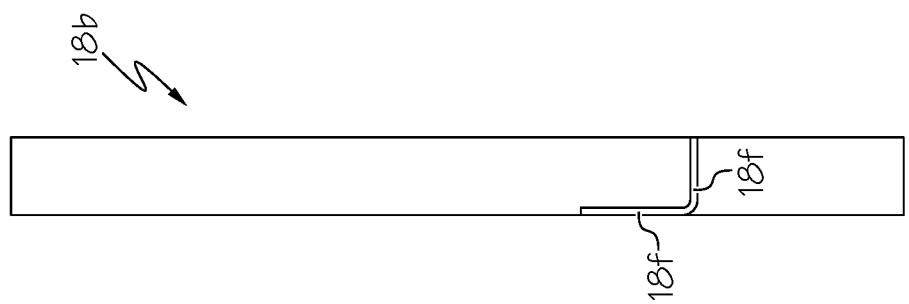
FIG. 14A is a right side elevation view of the right down tube of FIG. 12.
Figure 13:
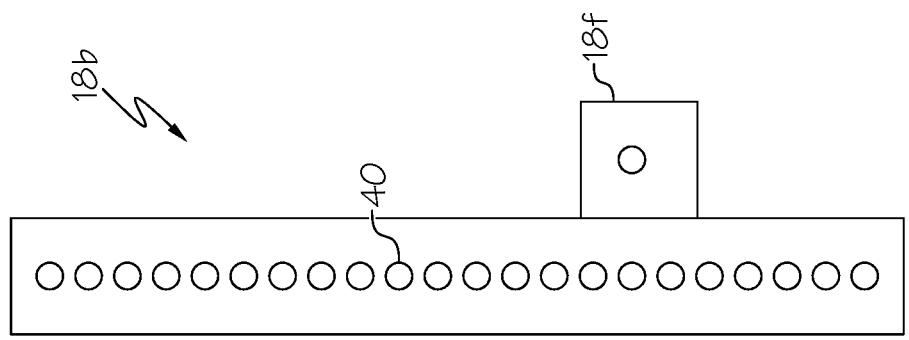
FIG. 13 is a front side elevation view of the right down tube of FIG. 12.
Figure 12:
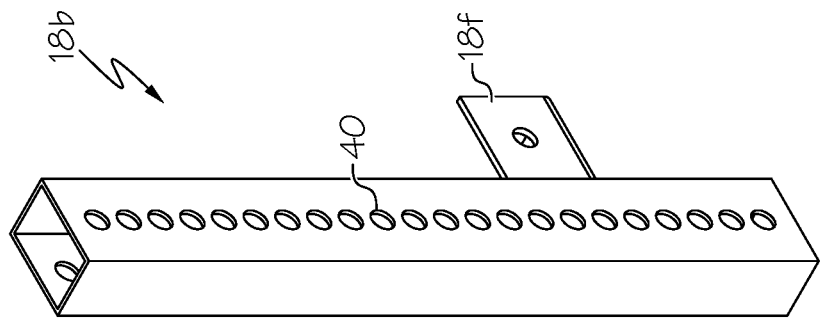
FIG. 12 is a perspective view of a right down tube of a connection member of the rooftop mount device of FIG. 1.
Figures 19, 20:
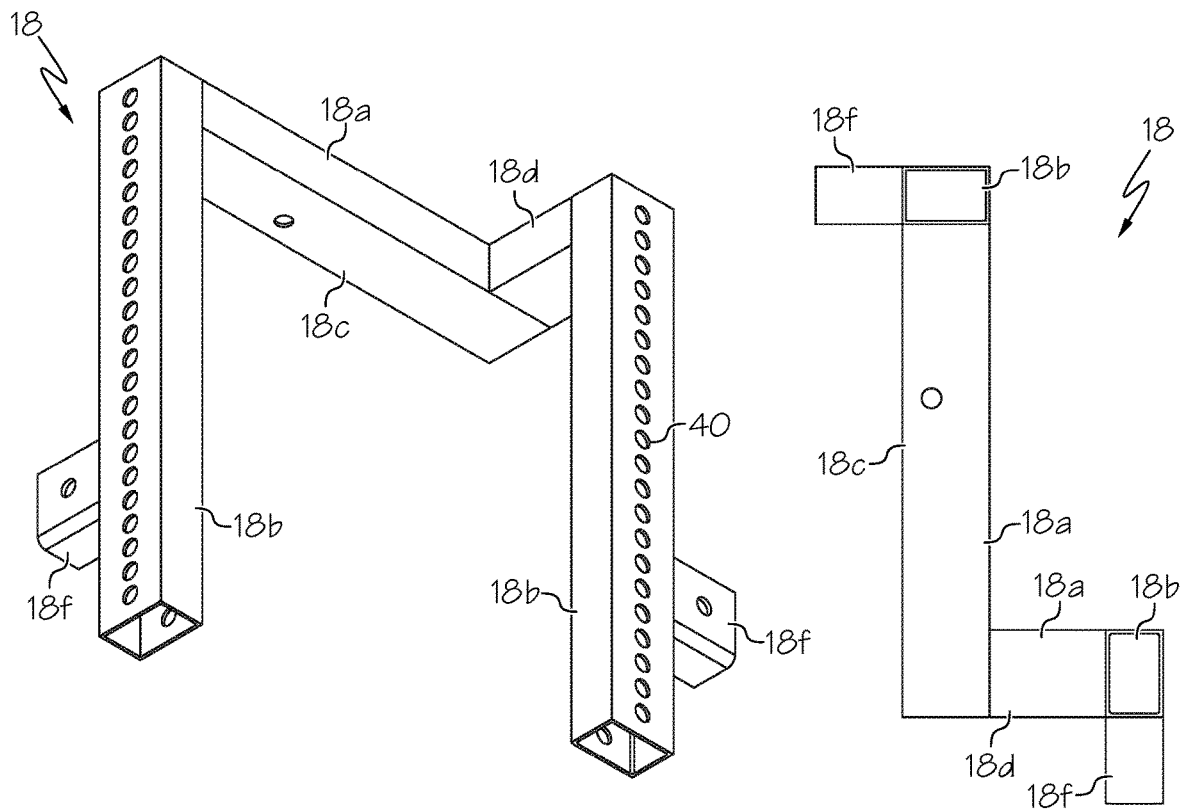
FIG. 19 is a perspective view of a left rear corner connection member of the rooftop mount device of FIG. 1.
FIG. 20 is a bottom plan view of the left rear corner connection member of FIG. 19.
Figures 21, 22:
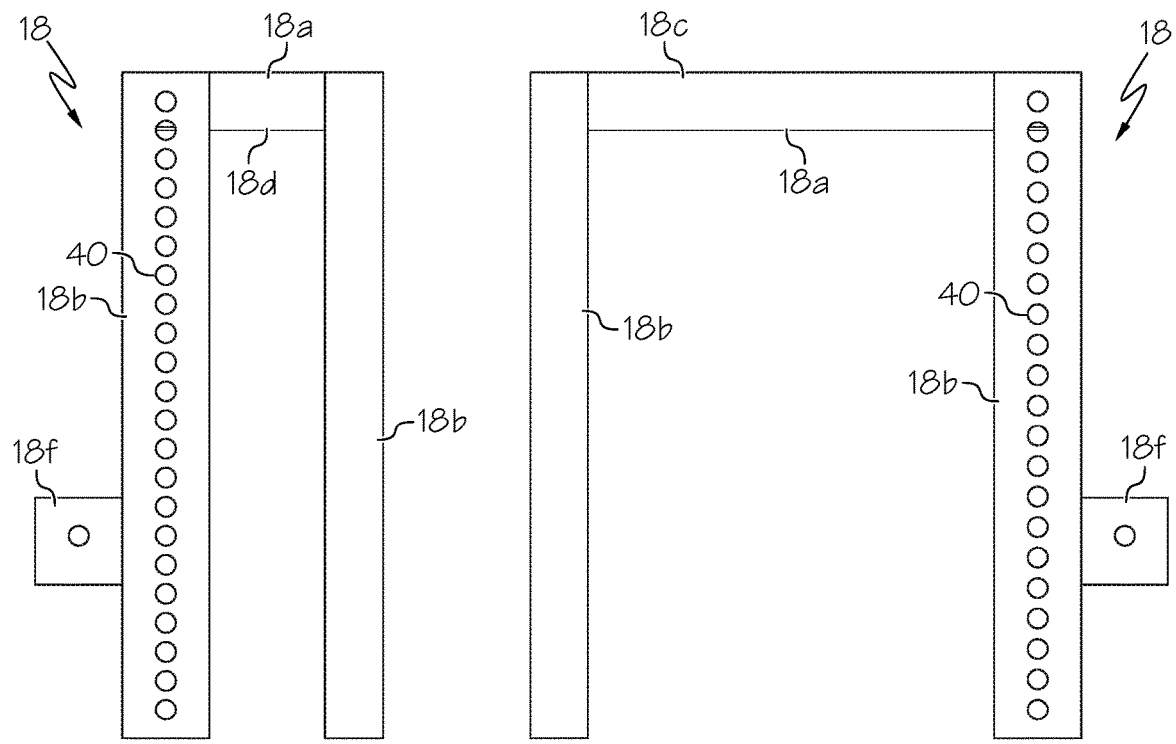
FIG. 21 is a left side elevation view of the left rear corner connection member of FIG. 19
FIG. 22 is a right side elevation view of the left rear corner connection member of FIG. 19.
Figure 24:
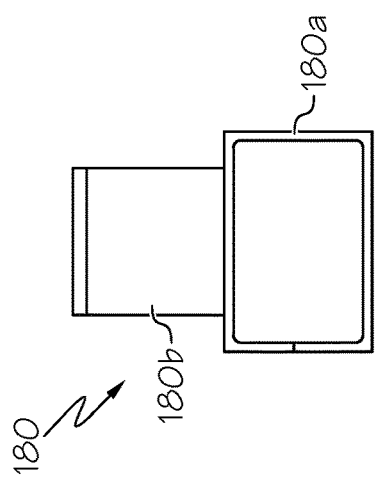
FIG. 24 is a bottom plan view of the tab mount device of FIG. 23.
Figure 26:
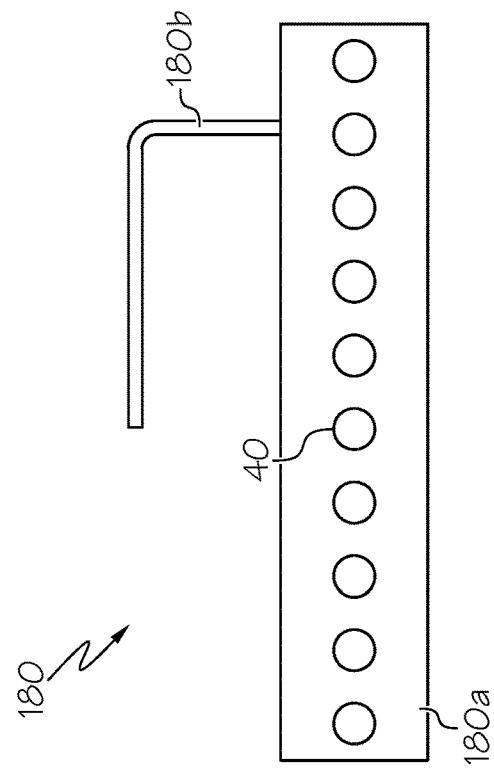
FIG. 26 is a left side elevation view of the tab mount device of FIG. 23, view of the tab mount device of FIG. 23, wherein the tab mount device is shown oriented horizontally.
Figure 23:
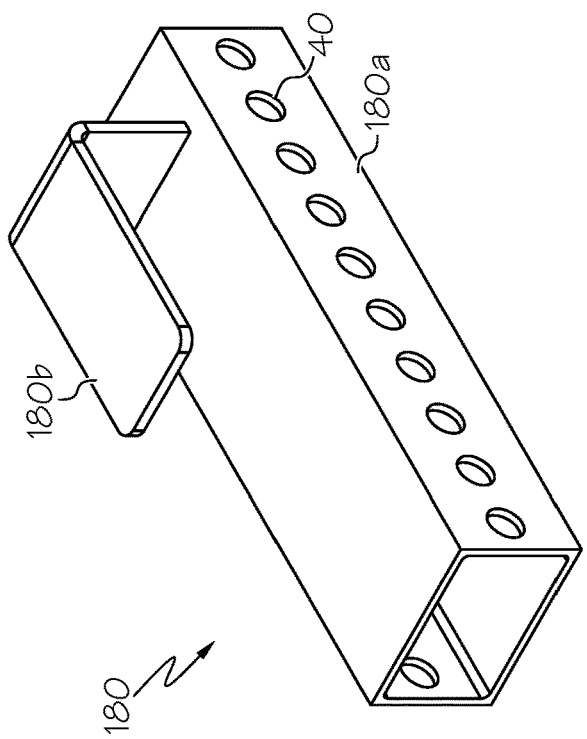
FIG. 23 is a perspective view of tab mount device for attachment to a shipping container.
Figure 25:
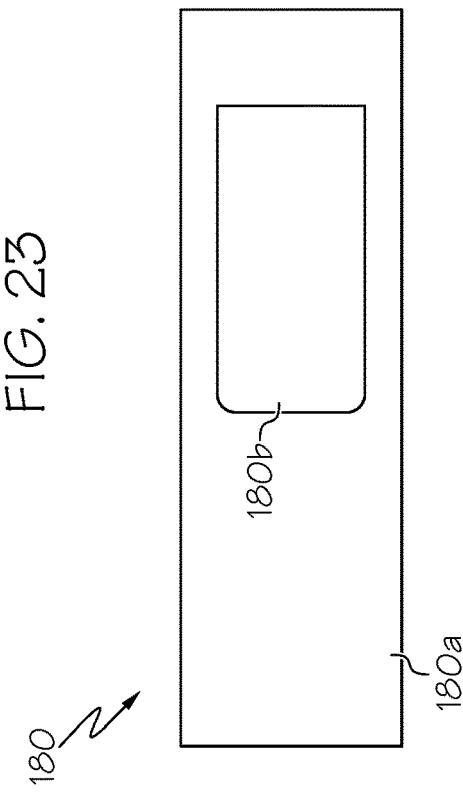
FIG. 25 is a rear side elevation view of the tab mount device of FIG. 23, wherein the tab mount device is shown oriented horizontally.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

As shown in FIGS. 1 and 2, the invention provides a rooftop mount device 10 (occasionally also referred to herein simply as a "rooftop mount") for connecting exercise equipment 12 to a roof 16 of a container 14 or other object. For convenience, the roof 16 is described herein with reference to the roof of a shipping container 14, e.g., an ISO shipping container of the type used to transport cargo on ships and trains. However, in other embodiments, the roof 16 may be part of an object 14 such as, for example, a storage container, a trailer of a tractor trailer, a box of a box truck, a trailer home, a motor home, a camper, a recreational vehicle, or any other portable object having sufficient height and enclosing an interior space in which exercise equipment is storable. The container 14 is a shipping container (e.g., an ISO shipping container) in exemplary embodiments, for example, the type of shipping container that is used to ship goods via oceangoing freight ships. In other embodiments, the container 14 may be another type of storage container. The container 14 includes side walls and a roof 16. The container 14 also includes a floor in most embodiments. In exemplary embodiments, the container 14 includes four vertical side walls that attach to the floor of the container at their bottom edges and to the roof of the container at their top edges. In those embodiments, the shape of the container is a parallelepiped and is either rectangular or square in longitudinal cross-section. In other embodiments, the side walls of the container may be curved or angled rather than vertical. In other embodiments, rather than four side walls, the container may have three, five, six, seven, eight, or more side walls. Although the container is constructed from metal (e.g., steel) in exemplary embodiments, other embodiments of the container may be constructed from a semimetal like aluminum, an alloy, a plastic or other hydrocarbon-based synthetic material, wood, or any other suitable material that is sufficiently strong, durable, and weather-resistant to store and transport the exercise equipment.

A bottom of the container 14 can rest upon a substrate such as, for example, the ground, a floor, a paved surface, a manufactured surface, a platform, a rail car, or a ship deck. Portions of the exercise equipment 12 are also placed upon and in contact with the substrate.

In most embodiments, the container 14 has a roof 16 supported by a front wall 14*a*, an opposing rear wall 14*b*, a left wall 14*c*, and an opposing right wall 14*d*, which connect to the roof at their top edges. The container 14 further includes a floor connected to the four walls at their bottom edges. Standard sizes of containers with which the rooftop mount device may be used include ISO shipping containers that are 5 feet, 6.5 feet, 8 feet, 10 feet, and 20 feet in length. However, embodiments of the rooftop mount device may be constructed to fit containers having lengths that are different lengths including intermediate lengths (e.g., 6, 7, 9, 11, 12, 12.5, 15, 16 or 17.5 feet), shorter lengths (e.g., 3, 4, or 4.5 feet), and longer lengths (e.g., 21, 22.5, 24, 25, 27.5, 30, 32, 40, 45, 48, 53, and 60 feet) so that containers of any length, including non-standard sized shipping containers, can be fitted with a rooftop mount device.

Figure 34:
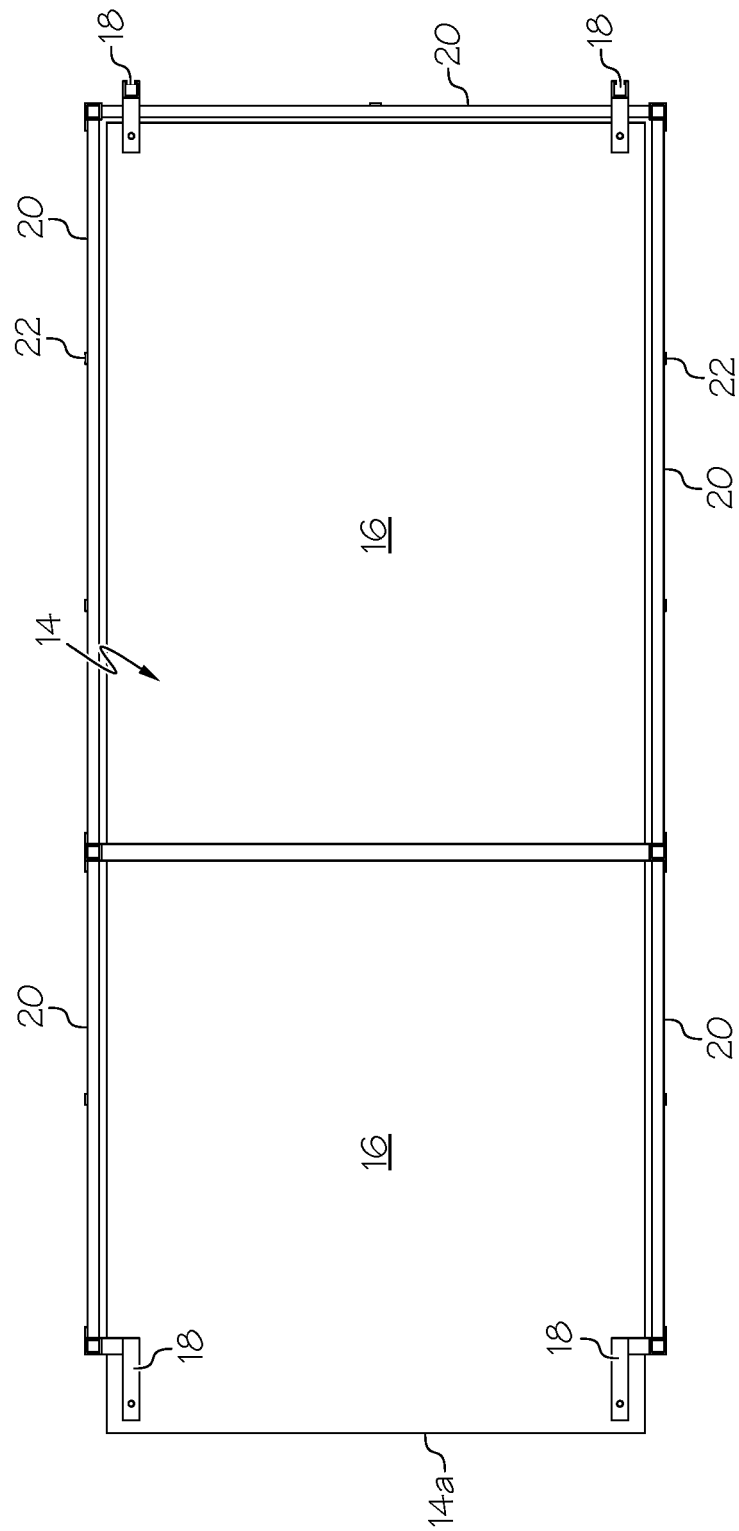
FIG. 34 is a top plan view of the rooftop mount device of FIG. 1 attached to a shipping container.
Figure 35:
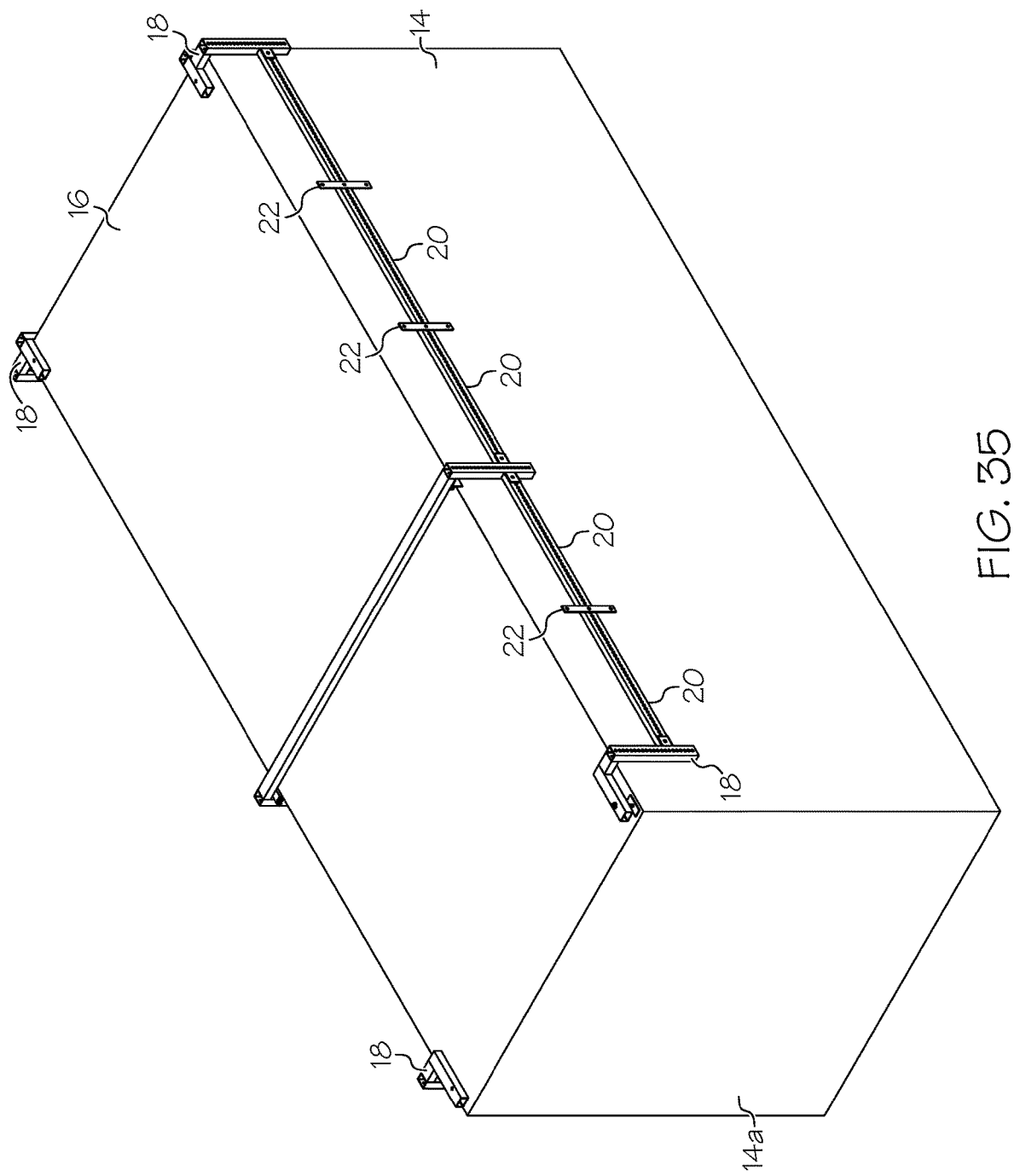
FIG. 35 is a perspective view of the rooftop mount device of FIG. 1 attached to the shipping container.
Figure 36:
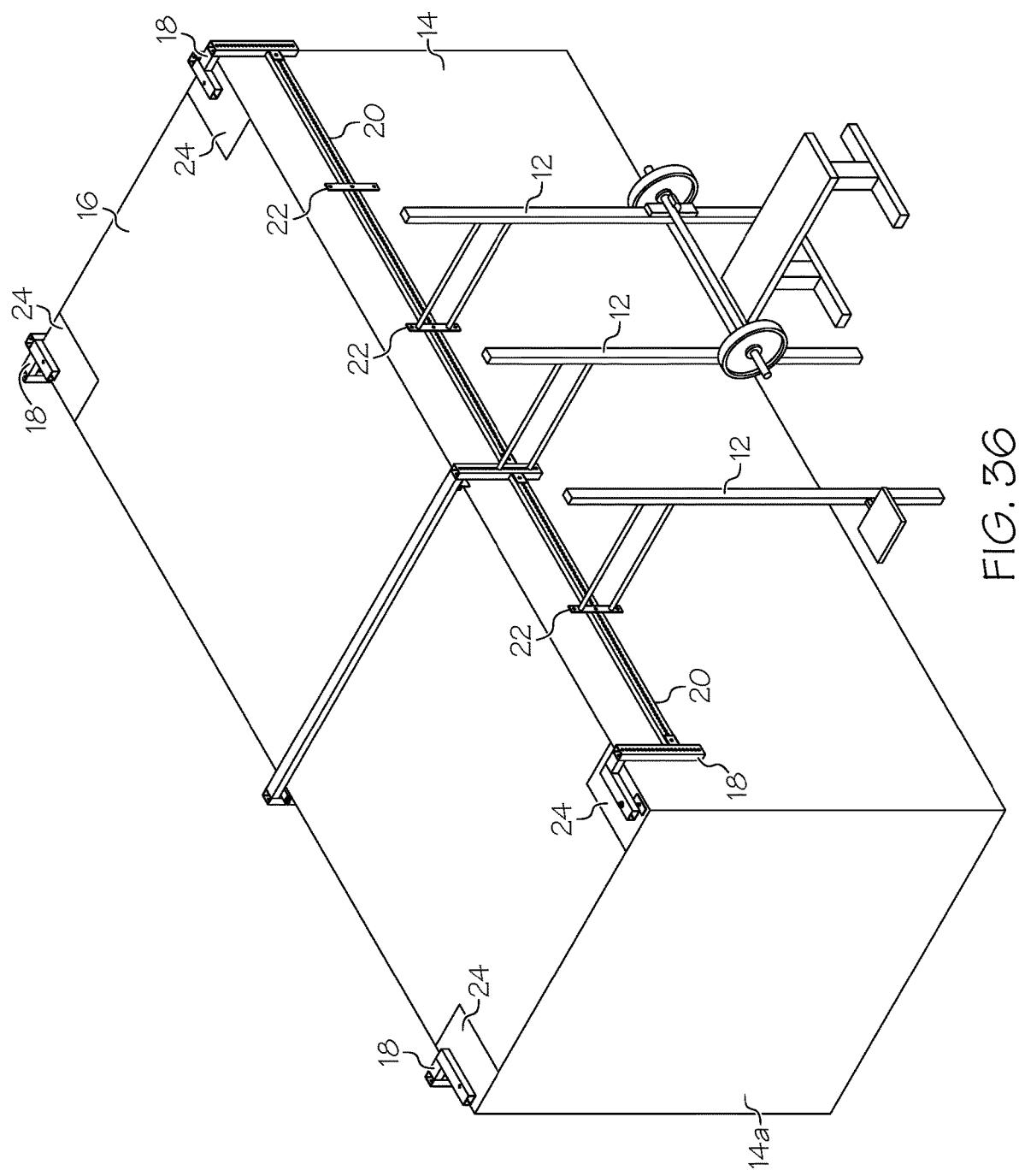
FIG. 36 is a perspective view of the rooftop mount device of FIG. 1 attached to the shipping container, along with exercise equipment attached to the rooftop mount device.
Figure 37:
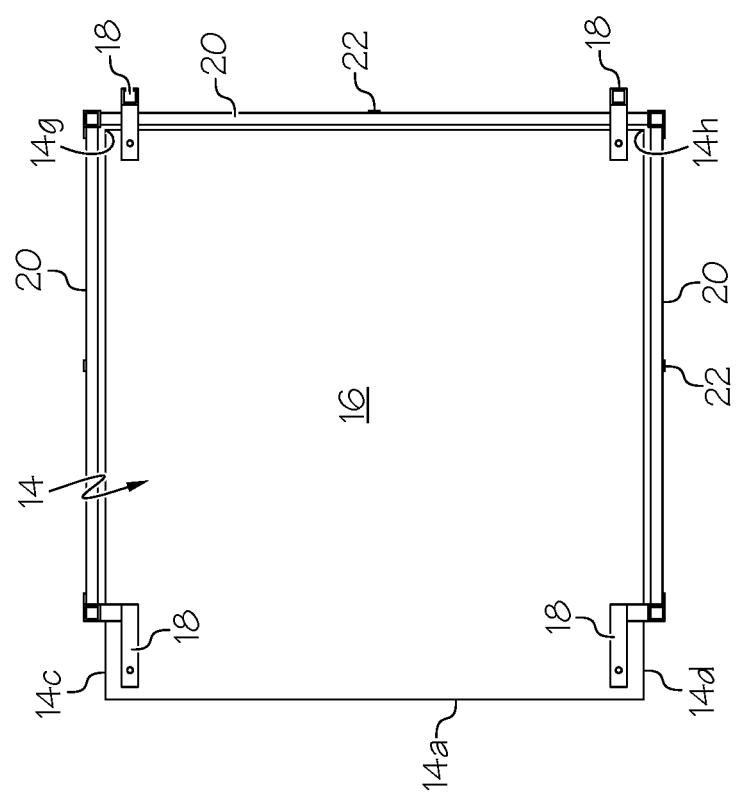
FIG. 37 is a top plan view of another embodiment of a rooftop mount device attached to a shipping container that is shorter in length than the shipping container shown in FIG. 1.
Figure 38:
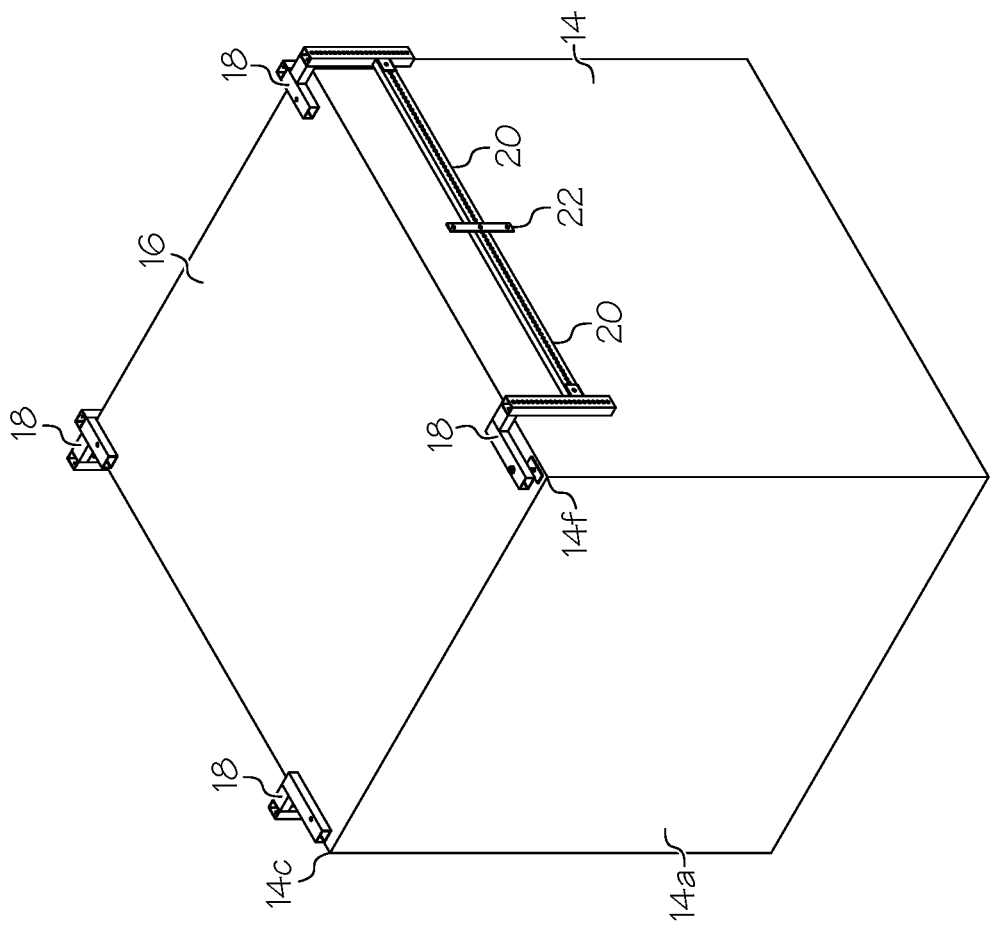
FIG. 38 is a perspective view of the rooftop mount device of FIG. 37 attached to the shipping container.

On its roof 16, the container 14 includes a front left corner 14*e*, a front right corner 14*f*, a rear left corner 14*g*, and a rear right corner 14*h*. In the case of containers that are rectangular in longitudinal cross-section, most such containers have doors or a door on one of the short sides of the container rather than on the long sides, although containers may be constructed with doors on any side or on multiple sides. An exemplary "long" container 14 (i.e., one that is 20 feet or more in length) is shown in FIGS. 34-36 with a rooftop mount device 10 of appropriate and corresponding length and width installed on its roof 16. An exemplary "short" container 14 (i.e., one that is less than 20 feet in length) is shown in FIGS. 37-38 with a rooftop mount device 10 of appropriate and corresponding length and width installed on its roof 16. In these examples, the container's door or doors are present on the front side 14*a* of the container 14 (that is, at the left side of the drawing) in FIGS. 34-36. Likewise, the container's door or doors are present on the front side 14*a* of the container 14 (that is, at the left side of the drawing) in FIGS. 37-38 also. The presence of the doors accounts for the lack of a horizontal stabilization member 20 installed in front of that side of each container in those drawings, which could block access to the interior compartment of the containers 14 by preventing the opening of their doors.

The rooftop mount device 10 includes at least two connection members 18 that are attachable to a roof 16 of a container 14 and a horizontal stabilization member 20. As shown in exemplary embodiments in FIGS. 1, 34, and 37, the rooftop mount device 10 can include a connection member 18 installed on and to each corner of the roof 16 (thus, four connection members 18 in total) and three horizontal stabilization members 20 (i.e., one installed in front of each of three sides of the container 14).

In some embodiments, the rooftop mount device 10 may include only a single connection member 18, which is attached to the roof 16 of the container 14. In such embodiments, exercise equipment 12 capable of being connected to and supported by only a single connection member 18 is attached to the single connection member. Such embodiments having only a single connection member 18 need not include a horizontal stabilization member 20 or any equipment attachment elements 22; however, in some embodiments having only a single connect member, one or more equipment attachment elements 22, one or more horizontal stabilization elements 20, or a combination of one or more of each are attached to the connection member.

The rooftop mount device 10 can also include one or more equipment attachment elements 22 for connecting exercise equipment 12 to the rooftop mount 10. The equipment attachment elements 22 are bars or plates having one or more holes or apertures to which exercise equipment 12 may be connected via pins or other fasteners (not shown in the drawings). The equipment attachment elements 22 can be generally rectangular in shape and have a first end and a second end. These equipment attachment elements 22 can be attached to the connection members 18, but in exemplary embodiments, are attached to the horizontal stabilization members 20. When attached to a horizontal stabilization member 20, an equipment attachment element 22 is oriented vertically so that it is installed on a front portion of the horizontal stabilization member in a perpendicular orientation relative to the horizontal stabilization member. Each equipment attachment element 22 may be adjusted vertically and horizontally in its position of attachment to the horizontal stabilization member 20 to which it is attached by removing the pin or other fastener from the aperture in which it is first inserted, moving the equipment attachment element 22 to a new position either or both horizontally and vertically, and inserting the pin or other fastener into a different hole of the equipment attachment element 22 or of the horizontal stabilization member. For example, if the user desired to connect the exercise equipment 12 at a higher or lower height, the pin (or other fastener) can be removed from the equipment attachment element 22 to disconnect the equipment attachment element from the horizontal stabilization member 20 at its point of attachment thereto. The equipment attachment element 22 can then be adjusted lower or higher relative to the horizontal stabilization member 20. Once a new desired height is reached, the pin (or other fastener) can be inserted into an aperture of the equipment attachment element 22, and through it, into the horizontal stabilization member 20 to fix the equipment attachment element 22 in position on and to the horizontal stabilization member at the selected, desired height.

Each equipment attachment element 22 can also be adjusted horizontally by a similar process as described in the preceding paragraph. For example, if the user needs to accommodate the connection of an item of exercise equipment that is larger or smaller than allowed by the then-current connection positions of the equipment attachment elements 22, the pin (or other fastener) can be removed from at least one equipment attachment element 22 to disconnect the equipment attachment element from the horizontal stabilization member 20 at its point of attachment thereto. The equipment attachment element 22 can then be adjusted horizontally in position along the length of the horizontal stabilization member 20 to move that equipment attachment element nearer to or farther from another equipment attachment element. Once a new desired position is reached, the pin (or other fastener) can be inserted into an aperture of the equipment attachment element 22, and through it, into the horizontal stabilization member 20 to fix the equipment attachment element 22 in position on and to the horizontal stabilization member at the selected, desired horizontal position.

Various items of exercise equipment 12 may be attached to the connection members 18, the horizontal stabilization members 20, and to the equipment attachment elements 22. For example, certain items of exercise equipment may be attached in cantilever fashion to one or more components of the rooftop mount device.

One exemplary embodiment of a connection member 18 suitable for connection to a left rear corner 14g of a container 14 is shown in FIGS. 19-22. A corresponding embodiment of a connection member 18 suitable for connection to a right rear corner 14h of the container 14 is shown in FIGS. 27-30. In exemplary embodiments, the connection members 18 are attachable to the roof 16 at existing holes in the container 14 such as, for example, the container's corner castings 24, which are typically present on each top corner of a shipping container's roof 16. For example, the connection members 18 can be installed at and through holes such as those at which the container's door or doors are installed. In this way, the rooftop mount 10 can be used to attach exercise equipment 12 to the container 14 without making new, additional holes in the container that could allow intrusion of water, animals, and debris. In other embodiments, additional holes may be drilled into and through the roof of the container for installation of the rooftop mount. However, with most containers, and particularly those having corner castings in the corners of their roofs, drilling additional holes in the roof for installation of the rooftop mount device is unnecessary.

The rooftop mount device 10 allows for attachment of exercise equipment 12 at a height of about 9 feet, or approximately the same height as the roof 16 of the container 20. In some embodiments, the rooftop mount device 10 is installed so that it is flush or near flush with the roof 16 of the container 14 meaning that no part of the rooftop mount extends above (or much above) the height of the container's roof. In other embodiments, vertical elements 18b of the connection members 18 may be constructed so that, when a connection member is installed on the roof, such vertical element 18b extends above the height of the roof (e.g., 6 inches, 12 inches, 18 inches, 2 feet, 3 feet, 4 feet, 5 feet, 10 feet, or more above the roof) to accommodate and allow for connection of exercise equipment that is taller than the roof and in other cases where attachment of the exercise equipment at heights greater than the height of the container is desired. Attachment to the roof permits optimal height for performing exercises using the exercise equipment. For example, if the exerciser is 6 feet tall or taller, the rooftop mount permits exercise equipment, such as a pull-up bar, to be installed at about 9 feet or higher from ground level, which allows a sufficient distance for the exerciser to raise and lower his or her body without touching the ground. Similar devices that attach to a side wall of a container permit installation of such bars at a maximum height of about 7.5 feet above ground level, which provides insufficient distance for the exerciser to perform pull-ups and other exercises without the exerciser's feet or legs touching the ground.

Although the rooftop mount device 10 is attached to the roof 16 of a shipping container 14 in exemplary embodiments, in other embodiments, the rooftop mount 10 may be attached to a roof 16 of another object 14, e.g., to the roof of an automobile, an RV, a camper, a mobile home, a trailer, or any other object of suitable height for attachment of the rooftop mount to which exercise equipment can be connected.

As shown in FIG. 36, the exercise equipment 12 includes bodyweight workout racks and other exercise equipment that are mountable to the roof 16 of the portable container 14 via connection to the rooftop mount 10. Such workout racks 12 include, for example, workout bars, racks, stands, rigs and riggings, and cages for calisthenics or bodyweight exercises. Climbing ropes may also be attached to the rooftop mount device. The portable gym system can include one or multiple pieces of exercise equipment. The exercise equipment includes one or more top horizontal components. Each top horizontal component features a connector capable of attaching to a connection member of the rooftop mount. Each piece of exercise equipment also includes one or more (and generally, at least two) feet that contact a substrate (e.g., the ground or a floor or paved area) to support the exercise equipment on a side that is away from the portable container. One or more of the feet may be height-adjustable feet. For example, an upright rack can include adjustable feet that allows the exerciser to increase or decrease the height of that piece of exercise equipment.

As shown in the drawings, the rooftop mount device 10 includes at least two connection members 18 that are attachable to the roof 16 of the portable container 14. The rooftop mount device 10 also includes at least one horizontal stabilization member 20, and in exemplary embodiments, at least two equipment attachment elements 22 connected to each horizontal stabilization member. In exemplary embodiments, the system includes four connection members with one connection member being installed at each corner of the container's roof. In other embodiments, the system can include one, two, three, five, six, seven, eight, or more connection members. In embodiments of the system that do not include connection members being installed in each corner of the container roof, the connection members may each be attached to the roof of the portable container on the same side of the roof. The connection members are connected to the roof by bolts, although other fasteners like screws, nails, rivets, brackets, hooks, or any other suitable attachment means for connecting the rooftop mount to the roof of the portable container. The connection members are removably attached to the portable container's roof, although in some embodiments, they may be permanently attached.

In certain instances, when a small container 14 is used (e.g., a container that is 5, 6.5, or 8 feet in length), connection members 18 may be attached to the roof 16 of such container and exercise equipment 12 may be connected only to the connection members. In such embodiments that include small containers, horizontal stabilization members 20 may be excluded during assembly and installation of the rooftop mount device to the roof.

In some embodiments, one or more of the connection members 18 may be attached to a different side or sides of the roof 16 than the side of the roof to which at least one of the connection members is attached. For example, in an embodiment of the system in which the portable container 14 is shaped as a parallelepiped and that includes more than two connection members 18, the first and last connection members 18 may be attached each to the roof 16 at opposing sides of the portable container 14 while the other connection members between them are attached to a side of the roof that connects to each of the opposing sides. Each connection member 18 may be connected to the roof 16 of the container 14 at a corner casting 24, which include premade holes that can be utilized to attach the rooftop mount device to the storage container. Most storage containers 14 include a corner casting 24 at each corner at a top side of the container, i.e., on the roof 16.

In some embodiments, each connection member 18 includes at least one horizontal element 18a and at least one vertical element 18b as shown in FIGS. 19-22 and 27-30. The horizontal element 18a of the connection member 18 includes an attachment portion 18c at which the connection member is attachable to the roof 16 of the container 14 and an extension portion 18d that extends beyond the horizontal edge of the roof 16 when the rooftop mount device 10 is installed on the roof. The extension portion 18d of the horizontal element 18a allows attachment of the horizontal stabilization member 20 and exercise equipment 22 to the vertical element 18b at a distance sufficiently far enough away from the container's side wall to avoid the wall impeding free range of motion in performing exercises. The vertical element 18b of the connection member 18 includes a top portion 18e that connects to the extension portion 18d of the horizontal element 18a and a connection body 18f for attaching the at least one horizontal stabilization member 20 to the vertical element. The vertical element 18b extends downward parallel to, but not in contact with, a side wall of the container 14.

Each vertical element 18b of a connection member 18 may include at least one connection body 18f for receiving and holding one end of a horizontal stabilization member 20. The connection body 18f can be a bracket (as shown in FIGS. 19-22 and 27-30) attached to or constructed as part of the vertical element 18b of the connection member 18. The connection body 18f can also be a ledge, a plate, or any other suitable structure capable of receiving, holding, and retaining one end of the horizontal stabilization member 20 in position. A pin or other fastener (not shown in the drawings) may be employed to further secure the end of the horizontal stabilization member 20 to the connection body 18f of the connection member's vertical element 18b. In this manner, a first end of the horizontal stabilization member 20 is secured to and supported by a vertical element 18b of a first connection member 18 while the horizontal stabilization member's second end is secured to and supported by a vertical element 18b of a second connection member 18.

FIGS. 8-11 show a vertical element 18b of a connection member 18 on which the connection body 18f is located on a left side of the vertical element for attachment of one end (e.g., a second end 20b) of a horizontal stabilization member 20 to that left side of the vertical element. FIGS. 12-14B show a vertical element 18b of a connection member 18 on which the connection body 18f is located on a right side of the vertical element for attachment of one end (e.g., a first end 20a) of a horizontal stabilization member 20 to that right side of the vertical element. In exemplary embodiments, the horizontal element 18a and vertical element 18b of a connection member are permanently connected to form a single, unitary piece. However, in other embodiments, the vertical member 18b may be removably connectable to the horizontal member 18a of a connection member 18 so that the connection member is formed by the attachment of the horizontal element and vertical element together during assembly.

As shown in FIGS. 1-2 and 34-38, the shape and structure of the front connection members 18 may differ from the shape and structure of the rear connection members 18. For example, front connection members may be generally L-shaped on their top horizontal elements with each having only a single vertical element as shown in FIG. 31, whereas the rear connection members may also be generally L-shaped or T-shaped on their top horizontal elements but with each having two vertical elements as shown in FIGS. 19-22 and 27-30.

As shown in FIGS. 31-33, 35-36, and 38, the connection members installed at the front corners of a container may each include a bolt and nut plate to provide additional stability to the rooftop mount device 10 after installation on a roof 16 of a container 14 so that the rooftop mount does not move when the exercise equipment 12 is in use. The bolt and nut plate includes a bolt 38 that is passed through an aperture on that attachment portion 18c of the horizontal element 18a of a connection member 18. The aperture on the attachment portion 18c passes from the top of attachment portion through its bottom surface. When the bolt 38 is inserted therethrough, a plate 34 having an aperture passing through it is inserted over a free end of the bolt and a nut 36 is inserted over the free end of the bolt to tighten the plate against, for example, an inner surface of a corner casting 24 to secure the connection member to the roof 16 at that corner casting. The bolt and nut plate might also be used to level the rooftop mount device 12 in some circumstances.

In other embodiments as shown in FIGS. 23-26, the at least two connection members 180 can each include a vertical portion 180a and a tab 180b protruding from one side. The tab 180b is sized and shaped to fit into an aperture on top of a corner casting 24 of the container 14 to permit installation of the at least two connection members 180 without tools. The corner castings 24 are located on the roof 16 of the container 14 as part of many containers' standard structural elements.

As shown in FIGS. 15-18, the horizontal stabilization member 20 is, or includes, a horizontal brace having a first end 20a and a second end 20b. The first end 20a of the horizontal stabilization member 20 attaches to a connection member 18. The second end 20b of the horizontal stabilization member 20 attaches to a connection member 18 that is different from the connection member to which the first end 20a was attached. As shown in FIGS. 1, 2, 35, 36, and 38, one or more equipment attachment elements 22 may be connected to the horizontal stabilization members 20. The one or more equipment attachment elements 22 are attachable to the horizontal stabilization member 20 via removable pins or other removable fasteners (not shown in the drawings) as described elsewhere herein, which may be moved from one position to another on the horizontal stabilization member to adjust horizontally the position of connected exercise equipment.

In embodiments of the rooftop mount device 10 installed on containers having lengths of 20 feet or longer, the rooftop mount device can further include a center brace 26 (e.g., a center pinch brace or center pressure brace) as shown in FIGS. 1-7 and 34-36. The center brace 26 has a left vertical portion 26a, a right vertical portion 26b, and a horizontal portion 26c. The left and right vertical portions 26a, 26b each attach to the roof 16 of the container 14 at opposing points located at left and right sides of the container between connection members 18 as shown in FIGS. 1 and 34-36. The horizontal portion 26c extends across the roof 16 and includes a first end that connects to the left vertical portion 26a and a second end that connects to the right vertical portion 26b.

The left vertical portion 26a and the right vertical portion 26b of the center brace 26 each include at least one connection body 26d for attaching the at least one horizontal stabilization member 20 to the vertical portion adjacent to it. As shown in FIGS. 4 and 5, the center brace 26 can include a plate 28 for contacting against the roof 16 at one side. The plate 28 extends downward from a bottom of the horizontal portion 26c. As is also shown in those drawings, the center brace 26 further includes a tension bolt 30 that, when tightened, presses the plate 28 against the roof 16 of the container 14 to maintain the at least one horizontal stabilization member 20, which is connected to the center brace, in position during use of the exercise equipment 12. Such pressure or tension can be exerted where the plate 28 makes contact with and against an inner or outer surface of a ridge cap that extends around the roof 16 of the container 14 above the side walls of the container. As shown in the FIGS. 4 and 6, the other end of the center brace 26, opposite to the end at which the plate 28 and tension bolt 30 are located, can also include a plate 32 extending downward from its bottom, which is useful for making contact against an inner or outer surface of a ridge cap that extends around the roof of the container above the side walls of the container.

The at least two connection members 18 include a plurality of apertures 40 for receiving pins or other fasteners to connect exercise equipment 12 to them. These apertures 40 are generally on the front or side surfaces (or both surfaces) of the vertical elements 18b of each connection member 18 as shown in FIGS. 19-22 and 27-30. The spacing between these apertures 40 can be about one inch, although both regular and irregular spacing of shorter and longer lengths between apertures are also contemplated for use with the various embodiments of the rooftop mount device 10, systems, and kits described herein.

The at least one horizontal stabilization member 20 includes a plurality of apertures 40 for receiving pins or other fasteners to connect exercise equipment 12 or equipment attachment elements 22 to it. These apertures 40 are generally on a front surface of each horizontal stabilization member 20 as shown in FIGS. 15-16, but may also be present on other surfaces of the horizontal stabilization member. The spacing between these apertures 40 can be about one inch, although both regular and irregular spacing of shorter and longer lengths between apertures are also contemplated for use with the various embodiments of the rooftop mount device 10, systems, and kits described herein.

The equipment attachment elements 22, which are attached in a generally vertical orientation relative to the horizontal stabilization member 20 to which they are attached, also include a plurality of apertures 40 for receiving pins or other fasteners to connect exercise equipment 12 to them. These apertures 40 are generally on a front surface of each equipment attachment element 22 as shown in FIGS. 1-2, but may also be present on other surfaces of the equipment attachment element. The spacing between these apertures 40 can be about one inch, although both regular and irregular spacing of shorter and longer lengths between apertures are also contemplated for use with the various embodiments of the rooftop mount device 10, systems, and kits described herein.

The rooftop mount device 10 can feature one or more equipment attachment elements 22 connected to the at least one horizontal stabilization member 20, wherein each of the one or more equipment attachment elements is adjustable in its position of attachment to the at least one horizontal stabilization member.

The connections between the various parts of the rooftop mount device 10 may be permanent or removable. Each connection member 18 and horizontal stabilization member 20 is hollow, and as described above, includes one or more apertures or holes 40 that extend through an exterior surface and into a hollow cavity for receiving bolts, screws, or other fasteners to attach top horizontal components of the exercise equipment 12. The top horizontal components of the bars, racks, stands, rigs and riggings, and cages for calisthenics or bodyweight exercises are attachable to the equipment attachment elements of the rooftop mount 10 so as to maintain the exercise equipment 12 in position for use by an exerciser. One or more equipment attachment elements 22 may be connected, permanently or removably, to each horizontal stabilization member 20 in some embodiments. The one or more holes 40 of the equipment attachment elements 22 can be spaced at even intervals or at irregular intervals across a front side of each equipment attachment element. The holes 40 allow the top horizontal components of the exercise equipment 12 to be adjusted vertically for optimal height for a particular exercise or for a particular exerciser (e.g., based on the exerciser's personal height).

In some alternate embodiments, the connection members 18 and one or more of the attached equipment attachment elements 22 may form a single unitary piece that is connected to the portable container's roof 16. For example, a single combined and unitary connection member and equipment attachment element can be a L-shaped mount, wherein a horizontal arm of the L-shaped mount attaches to the roof of the container, and a vertical arm of the L-shaped mount extends perpendicularly downward from one end of the horizontal arm. The horizontal arm can include a first end that is on top of the container's roof and a second end that overhangs the roof and from which the vertical arm extends downward at a distance from a side wall of the container. The horizontal stabilization member can be attached to the vertical arms of first and second L-shaped mounts. Top horizontal components of the exercise equipment can also be attached to the vertical arms.

In some embodiments, the horizontal stabilization member 20 also may be permanently attached to the equipment attachment elements 22 so as to also form part of the single unitary piece that is connected to the portable container's roof 16.

The horizontal stabilization member 20 is a generally horizontal bar that is connected (removably or permanently, but preferably removably) at a first end 20a to a connection member 18 of the rooftop mount 10 and at a second end 20b to another connection member 18. For example, the rooftop mount 10 can include a first connection member 18 installed at a left corner of the roof 16 on one side of the container 14 and a second connection member 18 installed at a right corner of the roof on that same side of the container. As shown in FIGS. 34-38, a first end 20a of the horizontal stabilization member 20 can be attached to the first connection member 18 and a second end 20b of the horizontal stabilization member 20 can be attached to the second connection member 18. The horizontal stabilization member 20 may also include one or more holes 40 that permit additional equipment attachment elements 22 to be attached to it at a position or positions desired by the exerciser along the length of the horizontal stabilization member. This adjustability feature allows the exerciser to attach the exercise equipment (e.g., the top horizontal components of a power rack) to any point on the horizontal stabilization member.

Additional equipment attachment elements 22 may be attached to the horizontal stabilization member 20 between its first and second ends 20a, 20b. For example, the rooftop mount 10 can include third, fourth, fifth, or more equipment attachment elements 22 connected to the horizontal stabilization member 20 between the first and second equipment attachment elements. In some embodiments, unlike the first and second equipment attachment elements 22, which may be connected to first and second connection members 18, respectively, these additional equipment attachment elements 22 may be attached to the horizontal stabilization member 20 only and not to any piece of the rooftop mount 10 that is connected directly to the container's roof 16 (i.e., not to any of the connection members 18). In other embodiments, such additional equipment attachment elements 22 may be attached to additional (i.e., third, fourth, etc.) connection members 18, wherein the additional connection members are attached to the roof 16 of the container 14.

In exemplary embodiments, the rooftop mount device 10 is made of steel or other metal. In other embodiments, the rooftop mount 10 may be made from a semimetal like aluminum, an alloy, a plastic or other hydrocarbon-based synthetic material, wood, or any other suitable material that is sufficiently strong, durable, and weather-resistant to store and transport the exercise equipment 12. In some embodiments, one or more of the various components of the rooftop mount 10 may be constructed from materials that differ from the materials from which the other component or components are constructed.

The invention also relates to a kit that includes the parts of the rooftop mount device 10 described herein above. The components of the rooftop mount device 10 may be provided as parts of a kit that can be assembled to use with a container 14 already in the possession or control of the user. In this way, existing containers may be repurposed using the kit, which contains the rooftop mount device 10 for assembly and mounting onto the roof 16 of such existing container 14. In the case of kits, only the rooftop mount device and its parts are provided to the user because the user already has his or her own container. As a kit, the rooftop mount device 10 can be disassembled when the user desires to use the container 14 for purposes other than exercise purposes. The stand-alone portable gym kit includes a rooftop mount 10 that can be used to re-purpose any existing container for conversion into a portable gym container system. Such a kit can include all of the necessary fasteners and attachment apparatuses necessary to connect the rooftop mount to a roof of the container. The portable gym kit can also include exercise equipment as described elsewhere herein as well as other fitness equipment such as, for example, weights, balls, ropes, etc., along with storage means to prevent the exercise equipment and any related fitness equipment from moving around inside the container during storage and transport.

The invention also relates to a portable gym system. In an exemplary embodiment, the portable gym system includes the rooftop mount device 10, exercise equipment 12, and a container 14. In other embodiments, the portable gym system may include only the rooftop mount device 10 and a container 14 so that the user must supply his or her own exercise equipment. In still other embodiments, the portable gym system may include only the rooftop mount device 10 and exercise equipment 12 so that the user must supply his or her own container 14 The portable gym system can include one rooftop mount and corresponding exercise equipment for attachment thereto on each side the portable container's roof. For example, when the portable container is shaped as a parallelepiped, the portable gym system can include four rooftop mounts, one for each side of the portable container, although in some embodiments, the system could include fewer than four rooftop mounts (e.g., one, two, or three) for attachment to the roof of the portable container. In other embodiments of the system in which the portable container and its roof include more or less than four sides, the system can include one rooftop mount for each side of the roof or fewer than one per each side of the roof.

The portable gym system is transportable from one location to another location. When not in use, for example, during transport, the exercise equipment is disassembled and stored inside the container. When the portable gym reaches a destination where use of the exercise equipment is desired, the exercise equipment is unpacked from the container and configured and assembled as desired. Certain parts of the exercise equipment are mounted to a roof of the container to provide stability and proper height for configuration, assembly, and use of the exercise equipment. The portable gym can be provided as a kit that may be assembled, disassembled, and transported for use, and particularly in locations where access to gym facilities and exercise equipment are otherwise unavailable.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A rooftop mount device for connecting to a roof of a container and attaching exercise equipment thereto, the rooftop mount device comprising:
   at least two connection members that are attachable to a roof of a container; and
   at least one horizontal stabilization member for connecting between two opposing connection members of the at least two connection members when the rooftop mount device is attached to the roof of the container;
   wherein exercise equipment is connectable to the rooftop mount device at the connection members, at the horizontal stabilization member, or at both;
   wherein the exercise equipment is adjustably attachable both horizontally and vertically at a plurality of connection points on the connection members and the horizontal stabilization member; and
   wherein the at least two connection members each comprise a vertical portion and a tab protruding from one side, wherein the tab is sized and shaped to fit into an aperture of a corner casting of the container to permit installation of the at least two connection members without tools.

2. The rooftop mount device of claim 1, wherein the exercise equipment comprises workout bars, racks, stands, rigs and riggings, and cages for calisthenics or bodyweight exercises.

3. The rooftop mount device of claim 1, comprising at least four of the connection members.

4. The rooftop mount device of claim 1, wherein each connection member connects to the roof of the container at a corner casting, wherein one corner casting is located at each corner at a top side of the container.

5. The rooftop mount device of claim 1, wherein each connection member comprises a horizontal element and a vertical element;
   wherein the horizontal element comprises an attachment portion at which the connection member is attachable to the roof of the container and an extension portion that extends beyond the horizontal edge of the roof when the rooftop mount device is installed on the roof;
   wherein the vertical element comprises a top portion that connects to the extension portion of the horizontal element and a connection body for attaching the at least one horizontal stabilization member to the vertical element; and
   wherein the vertical element extends downward parallel to, but not in contact with, a side wall of the container.

6. The rooftop mount device of claim 1, wherein the horizontal stabilization member comprises a horizontal brace comprising a first end and a second end, wherein the first end attaches to at least one of the connection members.

7. The rooftop mount device of claim 1, further comprising a center brace comprising a left vertical portion, a right vertical portion, and a horizontal portion; wherein the left and right vertical portions each attach to the roof of the container at opposing points located at left and right sides of the container between connection members; and wherein the horizontal portion extends across the roof and comprises a first end that connects to the left vertical portion and a second end that connects to the right vertical portion.

8. The rooftop mount device of claim 7, wherein the left vertical portion and the right vertical portion of the center brace each comprise at least one connection body for attaching the at least one horizontal stabilization member to the left or right vertical portion adjacent to the at least one horizontal stabilization member.

9. The rooftop mount device of claim 7, wherein the center brace comprises a plate for contacting against the roof at one side, wherein the plate extends downward from a bottom of the horizontal portion; and wherein the center brace further comprises a tension bolt that, when tightened, presses the plate against the roof of the container to maintain the at least one horizontal stabilization member in position during use of the exercise equipment.

10. The rooftop mount device of claim 1, wherein the at least two connection members comprise a plurality of apertures for receiving pins or other fasteners to connect exercise equipment to them.

11. The rooftop mount device of claim 1, wherein the at least one horizontal stabilization member comprises a plurality of apertures for receiving pins or other fasteners to connect exercise equipment to it.

12. The rooftop mount device of claim 1, further comprising one or more equipment attachment elements connected to the at least one horizontal stabilization member, wherein each of the one or more equipment attachment elements is adjustable in its position of attachment to the at least one horizontal stabilization member.

13. A portable gym system comprising:
   an object comprising a roof and a storage area for holding and storing exercise equipment;
   a rooftop mount device for connecting to the roof and attaching exercise equipment thereto, the rooftop mount device comprising:
      connection members that are attachable to the roof; and
      a horizontal stabilization member for connecting between vertical elements of two opposing connection members when the rooftop mount device is attached to the roof;
      wherein exercise equipment is connectable to the rooftop mount device at the connection members, at the horizontal stabilization member, or at both;
      wherein the exercise equipment is adjustably attachable both horizontally and vertically at a plurality of connection points on the connection members and the horizontal stabilization member; and
   wherein the at least two connection members each comprise a vertical portion and a tab protruding from one side, wherein the tab is sized and shaped to fit into an aperture of a corner casting of the container to permit installation of the at least two connection members without tools.

14. The portable gym system of claim 13, further comprising exercise equipment storable in the storage area of the object, wherein at least part of the exercise equipment is attachable to the rooftop mount device.

15. The portable gym system of claim 13, wherein the object is portable and encloses an interior space in which exercise equipment is storable; wherein the object comprises a shipping container, a storage container, a trailer of a tractor trailer, a box of a box truck, a trailer home, a motor home, a camper, or a recreational vehicle.

16. The portable gym system of claim 13, wherein the system comprises two horizontal stabilization members installed on two sides of the roof.

17. The portable gym system of claim 13, wherein the system comprises three horizontal stabilization members installed on three sides of the roof.

18. A rooftop mount device for connecting to a roof of a container and attaching exercise equipment thereto, the rooftop mount device comprising:
- at least two connection members that are attachable to a roof of a container, wherein each connection member comprises attachment means for connecting exercise equipment to the connection member without contacting a wall of the container;
- wherein exercise equipment is connectable to the rooftop mount device at the connection members;
- wherein the exercise equipment is adjustably attachable and repositionable both horizontally and vertically at a plurality of connection points on the connection members; and
- wherein the at least two connection members each comprise a vertical portion and a tab protruding from one side, wherein the tab is sized and shaped to fit into an aperture of a corner casting of the container, and wherein the tab is inserted into the aperture of the corner casting to install a connection member without tools.

19. A method for attaching exercise equipment to a roof of a container so that the exercise equipment is secure, stable, and adjustable in its position, the method comprising the steps of:

(a) attaching at least two connection members to a roof of a container, wherein each connection member comprises a vertical element that extends downward parallel to, but not in contact with, a side wall of the container;

(b) attaching at least one horizontal stabilization member between the vertical elements of the at least two connection members; and (c) connecting exercise equipment to the at least two connection members, to the at least one horizontal stabilization member, or to both;

wherein the exercise equipment is adjustably attachable both horizontally and vertically at a plurality of connection points on the at least two connection members and the at least one horizontal stabilization member; and wherein the at least two connection members each comprise a vertical portion and a tab protruding from one side, wherein the tab is sized and shaped to fit into an aperture of a corner casting of the container, and wherein the tab is inserted into the aperture of the corner casting to install a connection member without tools.

\* \* \* \* \*